US010982721B2

(12) United States Patent
Oosawa et al.

(10) Patent No.: US 10,982,721 B2
(45) Date of Patent: Apr. 20, 2021

(54) TORQUE TRANSMISSION JOINT AND ELECTRIC POWER STEERING DEVICE

(71) Applicant: NSK LTD., Tokyo (JP)

(72) Inventors: Ryou Oosawa, Maebashi (JP); Toru Segawa, Maebashi (JP); Toru Ishii, Maebashi (JP)

(73) Assignee: NSK LTD., Tokyo (JP)

( * ) Notice: Subject to any disclaimer, the term of this patent is extended or adjusted under 35 U.S.C. 154(b) by 207 days.

(21) Appl. No.: 16/307,633

(22) PCT Filed: Oct. 12, 2017

(86) PCT No.: PCT/JP2017/037040
§ 371 (c)(1),
(2) Date: Dec. 6, 2018

(87) PCT Pub. No.: WO2018/070485
PCT Pub. Date: Apr. 19, 2018

(65) Prior Publication Data
US 2019/0264751 A1 Aug. 29, 2019

(30) Foreign Application Priority Data
Oct. 13, 2016 (JP) .............................. JP2016-201983

(51) Int. Cl.
*F16D 3/74* (2006.01)
*B62D 5/04* (2006.01)
(Continued)

(52) U.S. Cl.
CPC ............. *F16D 3/74* (2013.01); *B62D 5/0409* (2013.01); *F16D 3/50* (2013.01); *F16D 3/78* (2013.01);
(Continued)

(58) Field of Classification Search
CPC ..... F16D 3/74; F16D 3/50; F16D 3/78; B62D 5/0409; F16H 1/16; F16H 55/24; F16H 57/12
See application file for complete search history.

(56) References Cited

U.S. PATENT DOCUMENTS 2,074,941 A * 3/1937 Ricefield .................. F16D 3/68
464/73
2,400,110 A * 5/1946 Fitz Gerald ............... F16D 3/50
464/79
(Continued)

FOREIGN PATENT DOCUMENTS

DE 27 06 034 A1 8/1978
DE 35 17 166 A1 11/1986
(Continued)

OTHER PUBLICATIONS

International Search Report (PCT/ISA/210) dated Jan. 9, 2018 issued by the International Searching Authority in International Application No. PCT/JP2017/037040.
(Continued)

*Primary Examiner* — Ruth Ilan
*Assistant Examiner* — Conan D Duda
(74) *Attorney, Agent, or Firm* — Sughrue Mion, PLLC

(57) ABSTRACT

A first concave-convex portion of a first transmission member is engaged with an intermediate concave-convex portion of an intermediate transmission member with a circumferential gap being therebetween. A second concave-convex portion of a second transmission member is engaged with the intermediate concave-convex portion with a circumferential gap being therebetween. A first elastic member and a second elastic member are engaged with a first engagement portion and a second engagement portion of the intermediate transmission member such that separation between the intermediate transmission member and the first elastic member and the second elastic member can be prevented.

10 Claims, 19 Drawing Sheets

(51) Int. Cl.
  *F16H 1/16* (2006.01)
  *F16H 57/12* (2006.01)
  *F16H 55/24* (2006.01)
  *F16D 3/50* (2006.01)
  *F16D 3/78* (2006.01)
(52) U.S. Cl.
  CPC .............. *F16H 1/16* (2013.01); *F16H 55/24* (2013.01); *F16H 57/12* (2013.01); *F16H 2057/126* (2013.01)

(56) References Cited

U.S. PATENT DOCUMENTS

| | | | | |
|---|---|---|---|---|
| 2,830,445 | A * | 4/1958 | Kressin | F16D 3/74 464/87 |
| 3,296,827 | A * | 1/1967 | Landon, Jr. | F16D 3/78 464/92 |
| 3,355,910 | A * | 12/1967 | Pruner | F16D 3/68 464/7 |
| 3,362,191 | A | 1/1968 | Louette | |
| 3,383,883 | A * | 5/1968 | Dutaret | F16D 3/50 464/20 |
| 3,396,556 | A * | 8/1968 | Giegerich | F16D 3/50 464/73 |
| 3,626,767 | A * | 12/1971 | Wildi | F16D 3/50 74/16 |
| 3,662,568 | A * | 5/1972 | Kashima | F16D 3/74 464/93 |
| 3,698,208 | A * | 10/1972 | Williams | F16D 3/78 464/92 |
| 3,724,239 | A * | 4/1973 | Calistrat | F16D 3/78 464/92 |
| 3,788,099 | A * | 1/1974 | Miller | F16D 3/78 464/98 |
| 4,172,369 | A * | 10/1979 | Hayes | F16D 3/78 464/73 |
| 4,228,664 | A * | 10/1980 | McCoy | F16D 1/08 464/92 |
| 4,240,763 | A * | 12/1980 | Moore | F16C 3/02 403/203 |
| 4,464,142 | A * | 8/1984 | Bridges | F02P 7/10 123/146.5 A |
| 4,748,865 | A | 6/1988 | Umezawa et al. | |
| 4,921,470 | A * | 5/1990 | Kotani | F16D 3/46 464/147 |
| 5,176,575 | A * | 1/1993 | McCullough | F16D 3/78 464/147 |
| 5,178,026 | A * | 1/1993 | Matsumoto | F16D 3/74 464/73 |
| 5,564,981 | A * | 10/1996 | Iwabuchi | F16D 3/68 464/73 |
| 5,908,355 | A * | 6/1999 | Hoyt, III | F16D 3/58 464/88 |
| 5,928,083 | A * | 7/1999 | Monahan | F16D 3/68 192/41 R |
| 5,956,998 | A * | 9/1999 | Fenelon | E05B 81/25 292/144 |
| 6,183,368 | B1 * | 2/2001 | King | F16D 3/68 192/55.6 |
| 6,283,868 | B1 * | 9/2001 | Clarke | F16D 3/74 464/88 |
| 6,342,011 | B1 * | 1/2002 | Pokrandt | F16D 3/74 464/73 |
| 6,440,000 | B1 * | 8/2002 | Asa | F16D 3/58 464/147 |
| 7,883,423 | B2 * | 2/2011 | Kubota | F16D 3/68 464/73 |
| 9,193,384 | B1 * | 11/2015 | Murakami | F16H 55/24 |
| 2002/0142849 | A1 * | 10/2002 | Ash | F16D 3/74 464/87 |
| 2003/0050122 | A1 | 3/2003 | Yorston et al. | |
| 2004/0060379 | A1 * | 4/2004 | Bernhard | F16H 55/14 74/388 PS |
| 2004/0182188 | A1 * | 9/2004 | Nakamura | F16C 27/04 74/409 |
| 2005/0028629 | A1 * | 2/2005 | Acosta | F16H 55/14 74/440 |
| 2006/0117889 | A1 * | 6/2006 | Segawa | B62D 5/0409 74/425 |
| 2006/0169528 | A1 * | 8/2006 | Yuasa | F16C 27/04 180/444 |
| 2006/0183558 | A1 * | 8/2006 | Feldmann | F16D 3/78 464/93 |
| 2007/0158131 | A1 * | 7/2007 | Iwasa | B62D 5/0409 180/444 |
| 2007/0163374 | A1 * | 7/2007 | Yamazaki | F16C 27/04 74/409 |
| 2008/0009354 | A1 * | 1/2008 | Hodjat | F16D 3/54 464/87 |
| 2008/0128195 | A1 * | 6/2008 | Kubota | F16D 3/68 180/444 |
| 2008/0280709 | A1 * | 11/2008 | Gouadec | F16H 55/14 474/94 |
| 2010/0000355 | A1 * | 1/2010 | Yamashita | F16H 1/16 74/409 |
| 2011/0240399 | A1 * | 10/2011 | Suzuki | F16D 3/68 180/444 |
| 2012/0061168 | A1 * | 3/2012 | Hamakita | F16D 3/68 180/444 |
| 2012/0264524 | A1 * | 10/2012 | Nakagawa | F16D 3/12 464/73 |
| 2013/0341069 | A1 * | 12/2013 | Demaretz | F16D 3/78 174/138 R |
| 2014/0027197 | A1 * | 1/2014 | Kikuchi | B62D 5/0454 180/444 |
| 2014/0116608 | A1 * | 5/2014 | Sato | F16D 3/74 156/245 |
| 2014/0295978 | A1 * | 10/2014 | Louwersheimer | F16D 3/54 464/87 |
| 2015/0027248 | A1 * | 1/2015 | Yamada | B62D 5/04 74/89.14 |
| 2015/0041241 | A1 * | 2/2015 | Yoshikawa | B62D 5/0409 180/444 |
| 2015/0217804 | A1 * | 8/2015 | Moriyama | F16F 15/1245 180/444 |
| 2015/0266506 | A1 * | 9/2015 | Sato | B62D 5/0421 180/444 |
| 2015/0275946 | A1 * | 10/2015 | Ishizaki | F16D 3/68 403/359.1 |
| 2015/0298733 | A1 * | 10/2015 | Moriyama | F16H 1/16 180/444 |
| 2015/0354636 | A1 * | 12/2015 | Kaneda | F16D 1/0864 464/93 |
| 2016/0025209 | A1 * | 1/2016 | Anma | B62D 5/0409 74/409 |
| 2016/0146262 | A1 * | 5/2016 | Kogure | F16D 3/68 180/444 |
| 2016/0194024 | A1 * | 7/2016 | Kikuchi | F16H 55/22 180/444 |
| 2016/0319884 | A1 * | 11/2016 | Kleinewegen | F16D 3/50 |
| 2016/0319885 | A1 * | 11/2016 | Kleinewegen | F16D 3/68 |
| 2017/0058991 | A1 * | 3/2017 | Kim | F16D 3/68 |
| 2017/0114837 | A1 * | 4/2017 | Yamaguchi | F16D 3/74 |
| 2017/0174250 | A1 * | 6/2017 | Segawa | B62D 5/0409 |
| 2017/0175821 | A1 * | 6/2017 | Segawa | F16D 3/68 |
| 2017/0208784 | A1 * | 7/2017 | Lee | A01K 89/0105 |
| 2017/0217475 | A1 * | 8/2017 | Shiina | F16D 27/02 |
| 2017/0274925 | A1 * | 9/2017 | Kimijima | B62D 5/0409 |
| 2017/0297610 | A1 * | 10/2017 | Ishii | B62D 5/0409 |
| 2017/0335943 | A1 * | 11/2017 | Ko | F16H 55/24 |
| 2018/0066712 | A1 * | 3/2018 | Nakayama | F16D 1/0876 |
| 2018/0066713 | A1 * | 3/2018 | Oosawa | F16D 3/58 |
| 2018/0080502 | A1 * | 3/2018 | Oosawa | F16H 1/16 |
| 2018/0216391 | A1 * | 8/2018 | Takizawa | F16H 25/2056 |
| 2018/0216719 | A1 * | 8/2018 | Kim | F16H 57/028 |
| 2019/0170195 | A1 * | 6/2019 | Hauck | F16D 3/50 |
| 2019/0211884 | A1 * | 7/2019 | Ishii | F16D 3/54 |
| 2019/0232470 | A1 * | 8/2019 | Xu | F16D 3/76 |
| 2019/0264751 | A1 * | 8/2019 | Oosawa | F16H 1/16 |
| 2019/0334410 | A1 * | 10/2019 | Uchimura | F16H 1/16 |

(56) References Cited

U.S. PATENT DOCUMENTS

| | | | |
|---|---|---|---|
| 2020/0047789 A1* | 2/2020 | Yoshida | B62D 5/0424 |
| 2020/0055546 A1* | 2/2020 | Song | F16D 3/68 |
| 2020/0062305 A1* | 2/2020 | Kwon | B62D 5/0463 |
| 2020/0070884 A1* | 3/2020 | Kim | B62D 5/0409 |
| 2020/0096402 A1* | 3/2020 | Kim | G01L 3/109 |
| 2020/0158201 A1* | 5/2020 | Lan | H02K 7/06 |
| 2020/0204037 A1* | 6/2020 | Uchimura | H02K 5/148 |
| 2020/0248754 A1* | 8/2020 | Rubel | F16D 3/74 |
| 2020/0290666 A1* | 9/2020 | Oosawa | F16D 3/54 |
| 2020/0340557 A1* | 10/2020 | Jensch | H02K 7/116 |
| 2020/0369315 A1* | 11/2020 | Honda | F16D 3/54 |
| 2020/0373809 A1* | 11/2020 | Uchimura | F16H 1/16 |

FOREIGN PATENT DOCUMENTS

| | | |
|---|---|---|
| EP | 3 412 925 A1 | 12/2018 |
| JP | 2004-306898 A | 11/2004 |
| JP | 2010-124621 A | 6/2010 |
| JP | 2012-131249 A | 7/2012 |
| JP | 2013-160241 A | 8/2013 |
| JP | 2013-185667 A | 9/2013 |
| JP | 2015-189288 A | 11/2015 |
| WO | 2016/047643 A1 | 3/2016 |
| WO | 2016/047188 A1 | 1/2018 |

OTHER PUBLICATIONS

Written Opinion (PCT/ISA/237) dated Jan. 9, 2018 issued by the International Searching Authority in International Application No. PCT/JP2017/037040.
Communication dated Feb. 28, 2019, issued by the European Patent Office in counterpart European Application No. 17860826.1.

* cited by examiner

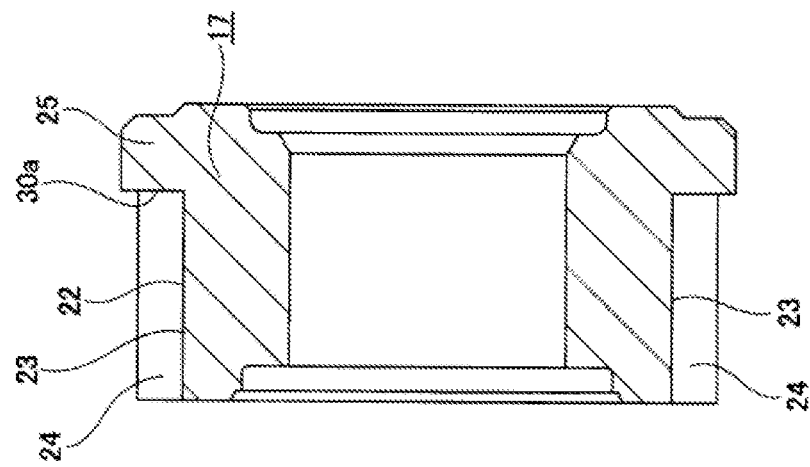

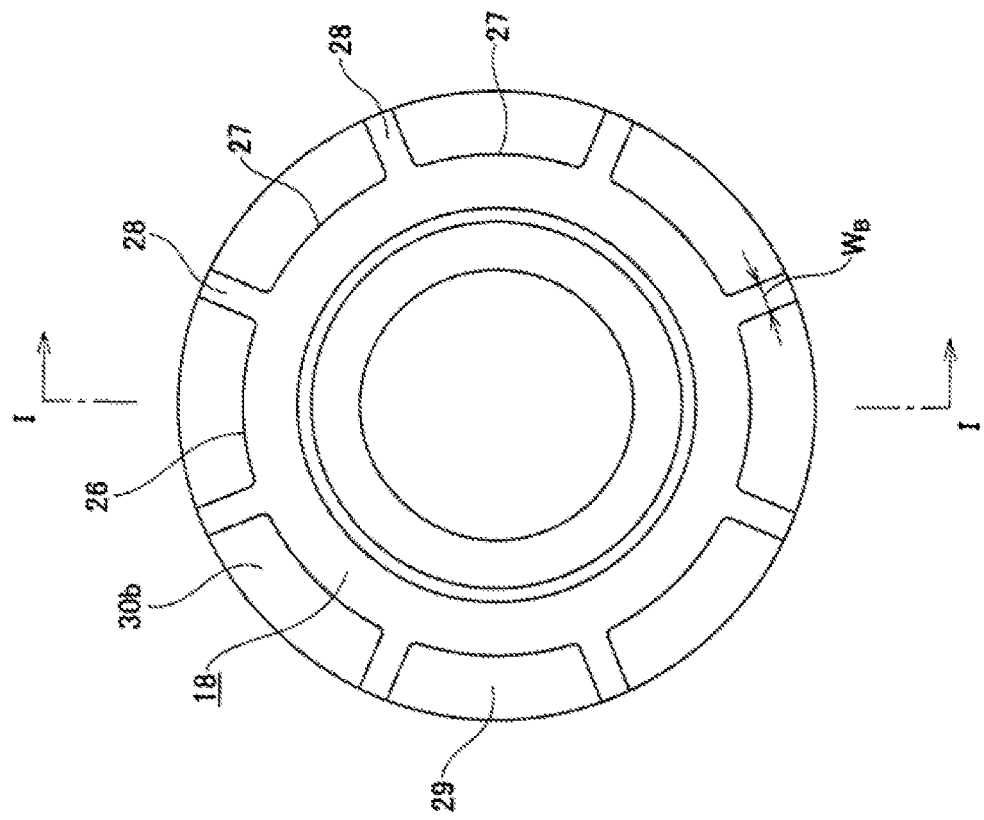

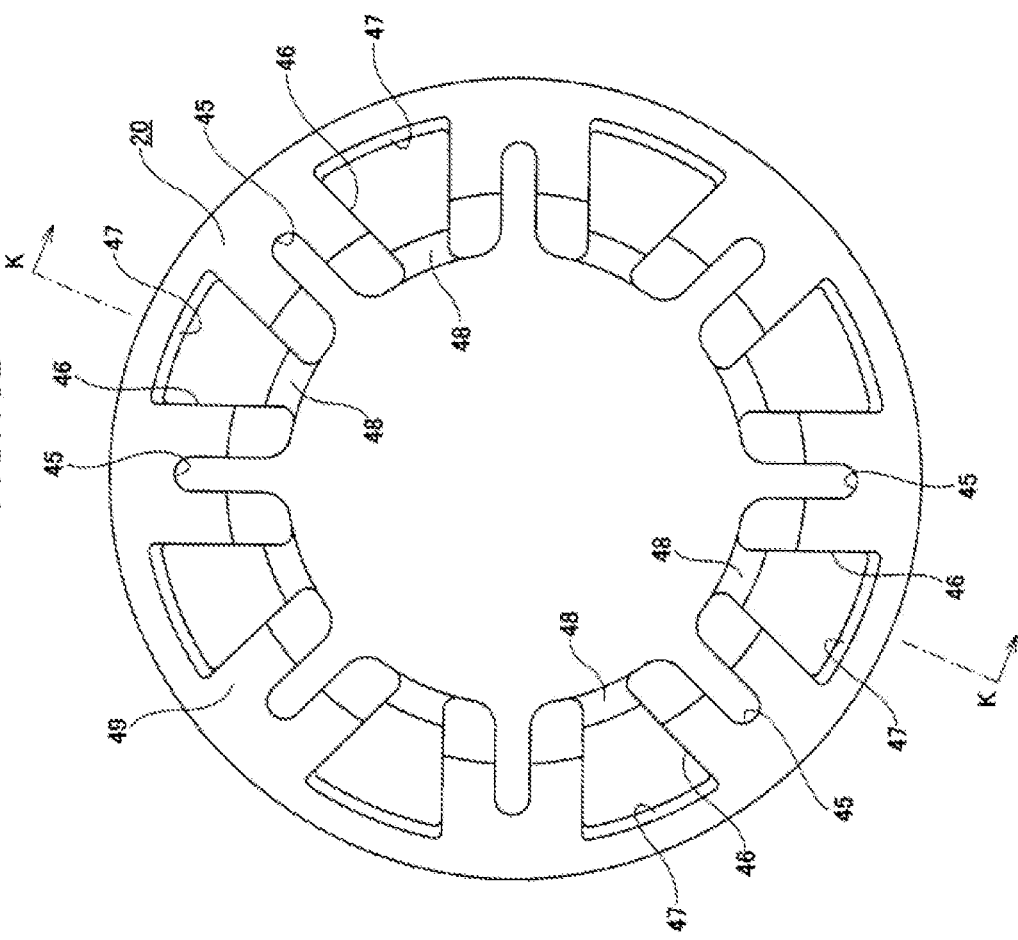
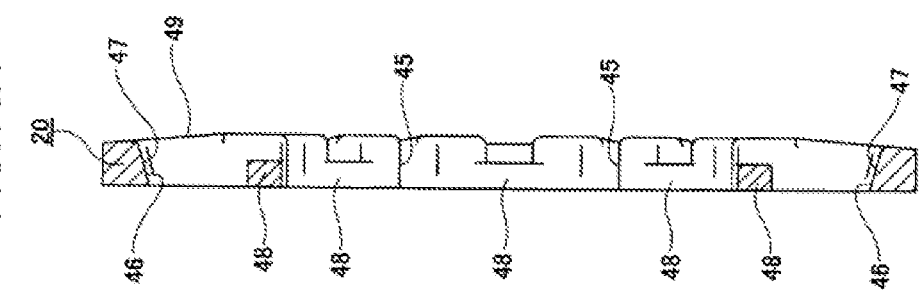
FIG.16A
FIG.16B

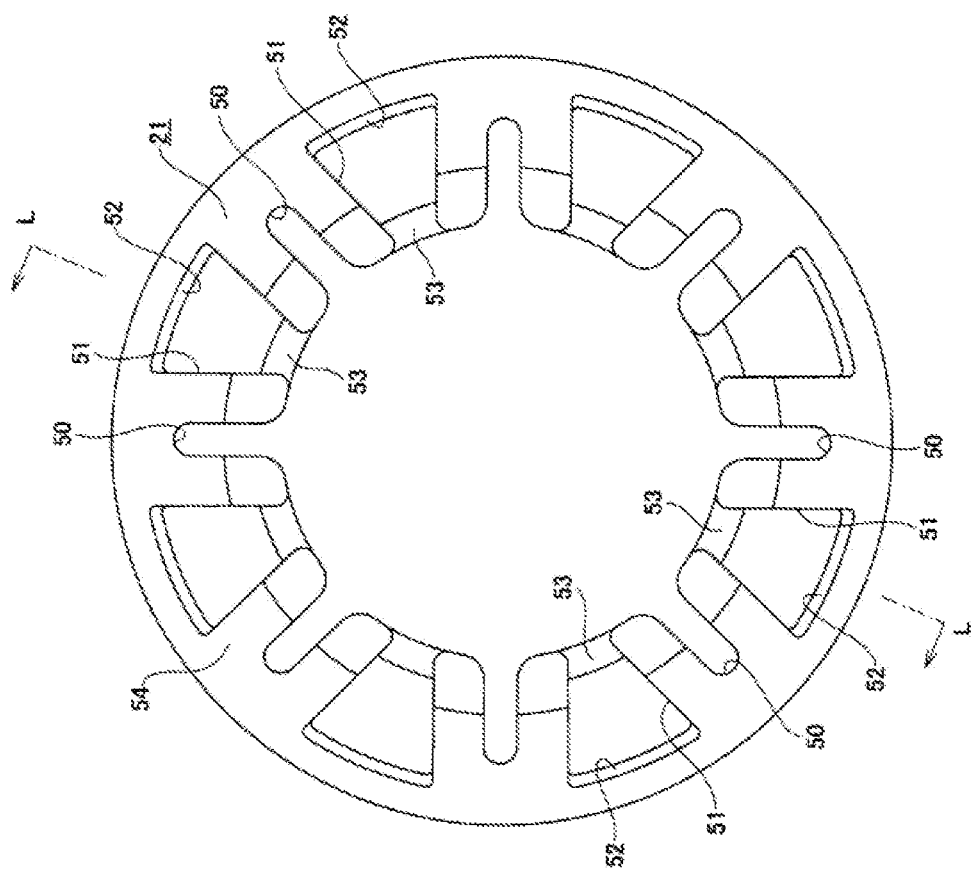

TORQUE TRANSMISSION JOINT AND ELECTRIC POWER STEERING DEVICE

TECHNICAL FIELD

The present invention relates to a torque transmission joint which is to be incorporated into various mechanical devices, for example, and used for transmission of torque between a driving shaft and a driven shaft. The present invention also relates to an electric power steering device which is to be used as a steering device of an automobile and is configured to use an electric motor as an auxiliary power source, thereby reducing a force necessary for a driver to operate a steering wheel.

BACKGROUND ART

FIGS. 18 and 19 show an example of a known electric power steering device described in Patent Document 1.

A front end portion of a steering shaft 2 to which a steering wheel 1 is attached at a rear end portion is rotatably supported in a housing 3, and a worm wheel 4 is fixed to a portion configured to rotate by the steering shaft 2. Worm teeth 5 configured to mesh with the worm wheel 4 are provided on an axially intermediate portion of a worm shaft 6, and both axial end portions of a worm 8 configured to rotate by an electric motor 7 are rotatably supported in the housing 3 by a pair of rolling bearings 9a, 9b such as a deep groove type ball bearing. A pressing piece 10 is externally fitted to a part of a tip portion of the worm shaft 6, which protrudes more than the rolling bearing 9a. An elastic member such as a coil spring 11 is provided between the pressing piece 10 and the housing 3. The worm teeth 5 provided on the worm shaft 6 is pressed toward the worm wheel 4 by the coil spring 11 via the pressing piece 10. By this configuration, backlash between the worm teeth 5 and the worm wheel 4 is suppressed to reduce generation of gear striking noise.

According to the conventional structure as described above, it is possible to suppress the generation of the gear striking noise at the meshing portion of the worm teeth 5 and the worm wheel 4. However, there is room for improvement in the aspect of suppressing an abnormal noise, which is to be generated at a coupling portion between a tip portion of an output shaft 12 of the electric motor 7 and a base end portion of the worm shaft 6. This is described as follows.

According to the structure shown in FIG. 19, in order to couple the tip portion of the output shaft 12 of the electric motor 7 and the base end portion of the worm shaft 6 such that torque can be transmitted, the base end portion of the worm shaft 6 is formed with a spline hole 13 opening to a base end surface of the worm shaft 6. The tip portion of the output shaft 12 is formed with a spline shaft portion 14. The spline shaft portion 14 and the spline hole 13 are spline-engaged. Thereby, the output shaft 12 and the worm shaft 6 are coupled such that the torque can be transmitted.

If the spline shaft portion 14 and the spline hole 13 are spline-engaged without a circumferential gap (without the backlash), an abnormal noise is not generated at the coupling portion (the spline engagement portion) between the tip portion of the output shaft 12 and the base end portion of the worm shaft 6. However, in the actual situation, the backlash exists at the spline engagement portion. Particularly, when the backlash between the worm teeth 5 and the worm wheel 4 is suppressed by the structure as shown in FIG. 19, it is not possible to completely remove the backlash of the spline engagement portion because it is necessary to allow swingable displacement of the worm shaft 6, and there is room for improvement.

Patent Document 2 discloses a structure where the output shaft of the electric motor and the worm shaft are coupled via a metallic power transmission member having a cylinder shape such that the worm shaft can be smoothly swingably displaced. In the structure disclosed in Patent Document 2, since the worm shaft is swingably displaced, the backlash exists at spline engagement portions between spline shaft portions (male spline) provided at both end portions of the power transmission member and spline holes (female spline) provided at respective end portions of the worm shaft and the output shaft of the electric motor, respectively. Therefore, there is room for improvement in suppressing generation of the abnormal noise when the rotational direction of the rotary shaft is reversed.

PRIOR ART DOCUMENT

Patent Document

Patent Document 1: JP-A-2004-306898
Patent Document 2: JP-A-2012-131249

SUMMARY OF INVENTION

Problems to be Solved by Invention

In view of the above circumstances, one aspect of the present invention provides a structure of a torque transmission joint capable of reducing generation of an abnormal noise when reversing a rotational direction of a driving shaft.

Means for Solving Problems

A torque transmission joint according to an embodiment of the present invention includes an intermediate transmission member, a first elastic member, a second elastic member, a first transmission member and a second transmission member.

The intermediate transmission member includes a main body portion including an intermediate concave-convex portion formed by alternately arranging concave portions and convex portions in a circumferential direction on one radial side periphery, first tooth portions provided at a plurality of circumferential positions on one axial side surface of the main body portion to protrude in an axial direction, second tooth portions provided at a plurality of circumferential positions on another axial side surface of the main body portion to protrude in the axial direction, a first engagement portion provided in at least one of the first tooth portions, and a second engagement portion provided in at least one of the second tooth portions.

The first elastic member is formed of an elastic material to have an annular shape and is configured to transmit torque with the intermediate transmission member by engaging with the first tooth portions and to be restricted from being displaced to one axial side with respect to the intermediate transmission member by engaging with the first engagement portion.

The second elastic member is formed of an elastic material to have an annular shape and is configured to transmit torque with the intermediate transmission member by engaging with the second tooth portions and to be restricted from being displaced to another axial side with respect to the intermediate transmission member by engaging with the second engagement portion.

The first transmission member includes a first concave-convex portion formed by alternately arranging concave portions and convex portions in the circumferential direction on another radial side periphery, wherein the first concave-convex portion is engaged with the first elastic member such that torque can be transmitted and is engaged with one axial end portion of the intermediate concave-convex portion with a circumferential gap being interposed therebetween such that torque can be transmitted (a circumferential side surface of the convex portion configuring the first concave-convex portion faces a circumferential side surface of the convex portion configuring the intermediate concave-convex portion).

The second transmission member includes a second concave-convex portion formed by alternately arranging concave portions and convex portions in the circumferential direction on another radial side periphery, wherein the second concave-convex portion is engaged with the second elastic member such that torque can be transmitted and is engaged with another axial end portion of the intermediate concave-convex portion with a circumferential gap being interposed therebetween such that torque can be transmitted (a circumferential side surface of the convex portion configuring the second concave-convex portion faces a circumferential side surface of the convex portion configuring the intermediate concave-convex portion).

In the above configuration, the first concave-convex portion may be engaged with the one axial end portion of the intermediate concave-convex portion in a state where the circumferential gap interposed therebetween is larger than a circumferential gap (between a circumferential side surface of the convex portion configuring the first concave-convex portion and a surface of the first elastic member, and including a case without a circumferential gap) interposed between the first concave-convex portion and the first elastic member at an engagement portion therebetween.

In the above configuration, the second concave-convex portion may be engaged with the another axial end portion of the intermediate concave-convex portion in a state where the circumferential gap interposed therebetween is larger than a circumferential gap (between a circumferential side surface of the convex portion configuring the second concave-convex portion and a surface of the second elastic member, and including a case without a circumferential gap) interposed between the second concave-convex portion and the second elastic member at an engagement portion therebetween.

In the above configuration, the first engagement portion may be provided on a radial side surface of the at least one of the first tooth portions, and the second engagement portion may be provided on a radial side surface of the at least one of the second tooth portions.

In the above configuration, as the first engagement portion, a first inclined engaging surface portion which is inclined in a direction in which a width dimension of the first tooth portion in the radial direction increases as proceeding toward one axial side or a first engagement protrusion protruding in the radial direction may be provided on at least one of one radial side surface and another radial side surface of the at least one of the first tooth portions, and as the second engagement portion, a second inclined engaging surface portion which is inclined in a direction in which a width dimension of the second tooth portion in the radial direction increases as proceeding toward the other axial side or a second engagement protrusion protruding in the radial direction may be provided on at least one of one radial side surface and another radial side surface of the at least one of the second tooth portions.

In the above configuration, a positioning side surface which is in contact with or closely facing an axial side surface of a coupling body of the intermediate transmission member, the first elastic member and the second elastic member may be provided on at least one of the first transmission member and the second transmission member.

In the above configuration, an axial side surface of a coupling body of the intermediate transmission member, the first elastic member and the second elastic member may have an inclined side surface portion which is inclined in a direction toward an axially center side of the coupling body as proceeding toward another radial side.

In the above configuration, a circumferential width dimension of a convex portion configuring at least one of the first concave-convex portion and the second concave-convex portion may decrease as proceeding toward an axially center side of the intermediate transmission member.

An electric power steering device according to an embodiment of the present invention includes a rotary shaft, a worm wheel, a worm and an electric motor.

The rotary shaft is rotatably supported to a housing.

The worm wheel is supported coaxially with the rotary shaft and configured to rotate together with the rotary shaft.

The worm includes a worm shaft and worm teeth provided on an outer periphery of the worm shaft and is rotatably supported to the housing with the worm teeth being meshed with the worm wheel.

The electric motor is configured to rotate the worm while being supported by the housing, for example.

An output shaft of the electric motor which is a driving shaft and the worm shaft which is a driven shaft are connected by a torque transmission joint such that torque can be transmitted.

The torque transmission joint is the above-described torque transmission joint. The first transmission member is fixed to or integrally formed with a tip portion of the output shaft of the electric motor, and the second transmission member is fixed to or integrally formed with a base end portion of the worm shaft.

The above electric power steering device may further include a preload applying mechanism which is provided between a tip portion of the worm shaft and the housing and configured to elastically press the worm toward the worm wheel.

Effect of the Invention

According to the above described torque transmission joint and electric power steering device, in a driving shaft fixed or integrally formed with the first transmission member at an axial end portion and a driven shaft fixed or integrally formed with the second at an axial end portion, generation of an abnormal noise can be suppressed when reversing a rotational direction of the driving shaft.

That is, in the above configuration, the first concave-convex portion is engaged with the one axial end portion of the intermediate concave-convex portion with the circumferential gap being interposed therebetween such that torque can be transmitted, and the second concave-convex portion is engaged with the another axial end portion of the intermediate concave-convex portion with the circumferential gap being interposed therebetween such that torque can be transmitted. Therefore, when torque is transmitted from the driving shaft to the driven shaft, in an initial stage, in an engagement portion between the first concave-convex portion and the first elastic member, the circumferential side surface of the convex portion configuring the first concave-convex portion can come into contact with the circumferential side surface of the convex portion configuring the intermediate concave-convex portion after the elastic deformation of the first elastic member. Similarly, in an engagement portion between the second concave-convex portion and the second elastic member, the circumferential side surface of the convex portion configuring the second concave-convex portion can come into contact with the circumferential side surface of the convex portion configuring the intermediate concave-convex portion after the elastic deformation of the second elastic member. Accordingly, the contact forces are weakened by the elastic deformation of the first elastic member and the second elastic member, so that generation of the abnormal noise caused as the contact occurs is suppressed. As a result, even when the rotational direction of the driving shaft is reversed, the generation of an abnormal noise can be suppressed by the engagement portions between the intermediate concave-convex portion and the first concave-convex portion as well as the second concave-convex portion.

In the present invention, the first elastic member is engaged with the first engagement portion of the intermediate transmission member to be restricted from being displaced to the one axial side with respect to the intermediate transmission member, and thus, separation between the first elastic member and the intermediate transmission member can be prevented in use. Also, the second elastic member is engaged with the second engagement portion of the intermediate transmission member to be restricted from being displaced to the another axial side with respect to the intermediate transmission member, and thus, separation between the second elastic member and the intermediate transmission member can be prevented in use.

BRIEF DESCRIPTION OF DRAWINGS

FIG. 12A and FIG. 12B show the first transmission member, in which FIG. 12A is a view as seen from a left side of FIG. 12B, and FIG. 12B is a sectional view taken along an H-H line of FIG. 12A.

FIG. 13A and FIG. 13B show the second transmission member, in which FIG. 13A is a sectional view taken along an I-I line of FIG. 13B, and FIG. 13B is a view as seen from a right side of FIG. 13A.

FIG. 15A to FIG. 15C show an intermediate transmission member, in which FIG. 15A is a view as seen from a left side of FIG. 15B, FIG. 15B is a sectional view taken along a J-J line of FIG. 15A, and FIG. 15C is a view as seen from a right side of FIG. 15B.

FIG. 16A and FIG. 16B show a first elastic member, in which FIG. 16A is a sectional view taken along a K-K line of FIG. 16B, and FIG. 16B is a view as seen from a right side of FIG. 16A.

FIG. 17A and FIG. 17B show a second elastic member, in which FIG. 17A is a sectional view taken along an L-L line of FIG. 17B, and FIG. 17B is a view as seen from a left side of FIG. 17A.

DESCRIPTION OF EMBODIMENTS

Embodiment

An embodiment of the present invention will be described with reference to FIGS. 1 to 17.

Figure 18:
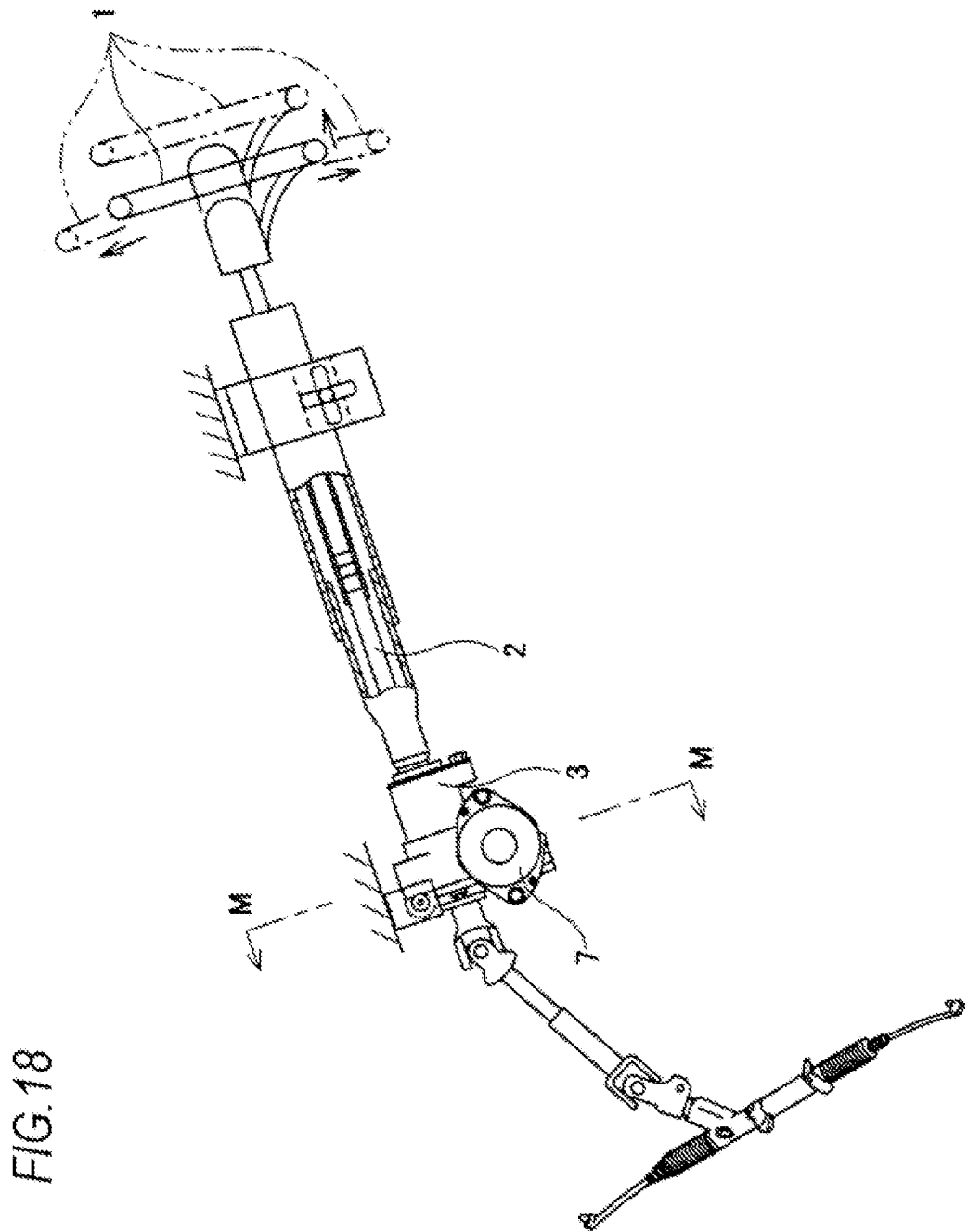
FIG. 18 is a partial sectional side view showing an example of a conventional structure of an electric power steering device.
Figure 19:
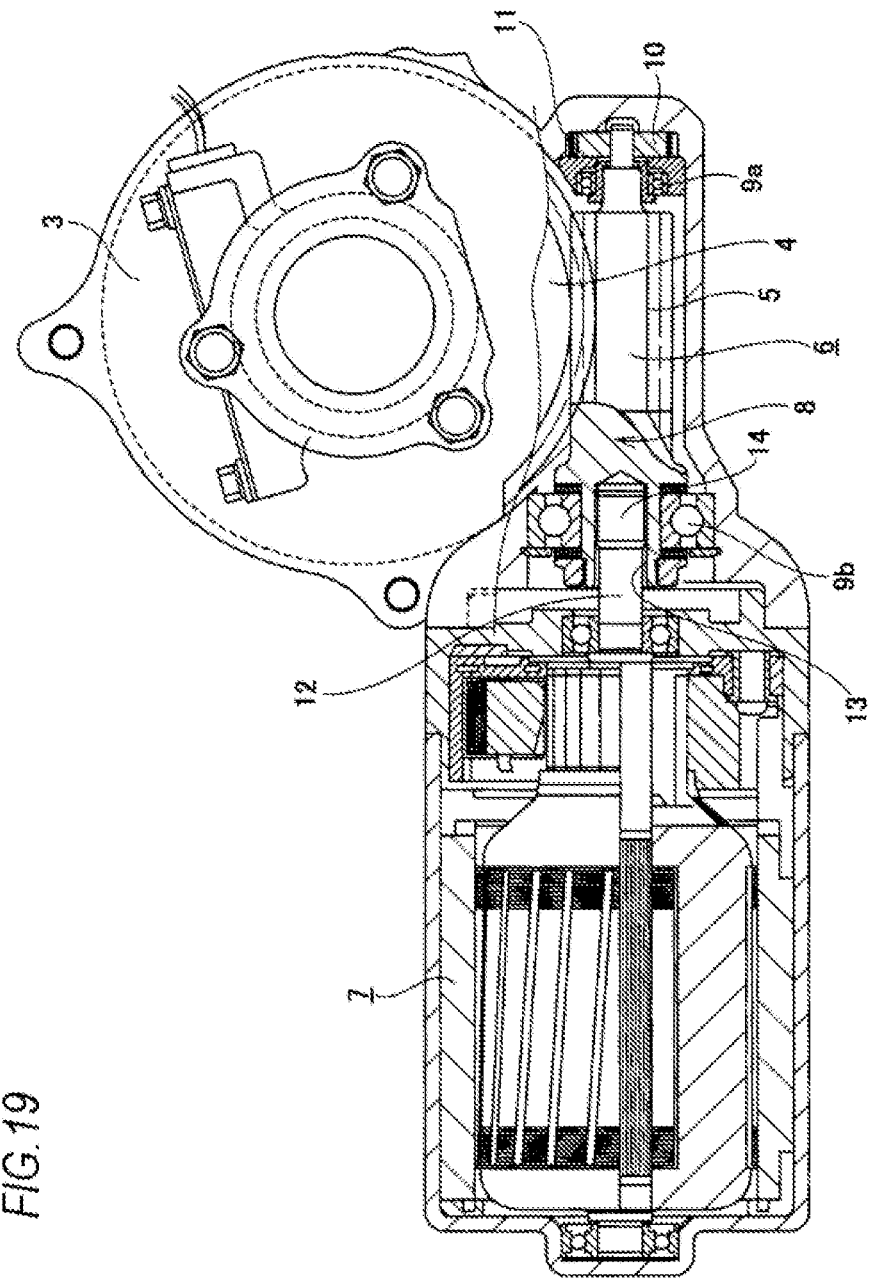
FIG. 19 is an enlarged sectional view of an M-M of FIG. 18.

In an electric power steering device of this embodiment, a front end portion of a steering shaft 2 to which a steering wheel 1 is attached at a rear end portion is rotatably supported in a housing 3, and a worm wheel 4 is fixed to a portion configured to rotate by the steering shaft 2, similarly to the conventional structure shown in FIGS. 18 and 19. Worm teeth 5 configured to mesh with the worm wheel 4 are provided on an outer periphery of an axially intermediate portion of a worm shaft 6a, and both axial end portions of a worm 8 configured to rotate by an electric motor 7 are rotatably supported in the housing 3 by a pair of rolling bearings (ball bearings in the illustrated example) 9a, 9b. A preload applying mechanism 15 including an elastic body such as a coil spring or a leaf spring is provided between the housing 3 and the rolling bearing 9a externally fitted to a tip portion of the worm shaft 6a. The preload applying mechanism 15 presses the worm teeth 5 provided on the worm shaft 6a toward the worm wheel 4 based on an elastic force of the elastic body. By this configuration, backlash between the worm teeth 5 and the worm wheel 4 is suppressed to reduce generation of gear striking noise.

In this embodiment, a tip portion of an output shaft 12a, serving as a driving shaft, of the electric motor 7 and a base end portion of the worm shaft 6a serving as a driven shaft, which are arranged in series in an axial direction, are coupled via a torque transmission joint 16 such that torque can be transmitted.

The torque transmission joint 16 includes a first transmission member 17, a second transmission member 18, an intermediate transmission member 19, a first elastic member 20 and a second elastic member 21.

In the present specification, in the torque transmission joint 16, "one axial side" refers to a right side in FIGS. 2 to 6, 8, 11, and "the other axial side" refers to a left side in FIGS. 2 to 6, 8, 11.

The first transmission member 17 is provided on the tip portion of the output shaft 12a. For example, as shown in FIG. 12, the first transmission member 17 is formed into an annular shape as a whole by a method such as injection molding, casting, forging, sintering, cutting or the like with a synthetic resin mixed with reinforcing fibers as necessary, or a metal such as an iron alloy, a copper alloy, an aluminum alloy or the like. The first transmission member 17 is externally fitted to the tip portion of the output shaft 12a by interference fitting, spline fitting, crimping or the like with relative rotation and axial relative displacement being restricted. However, when implementing the present invention, the first transmission member 17 may be formed integrally with the tip portion of the output shaft 12a.

A first concave-convex portion 22 formed by alternately arranging concave portions 23 and convex portions 24 in a circumferential direction is provided on an outer periphery of the first transmission member 17 from the other axial end portion to an axially intermediate portion (portion except for one axial end portion). A circular ring shaped first collar portion 25 is provided at one axial end portion on the outer periphery of the first transmission member 17 over an entire circumference thereof. One axial opening of the concave portion 23 configuring the first concave-convex portion 22 is blocked by a positioning side surface 30a which is the other axial side surface of the first collar portion 25.

Figure 14A:
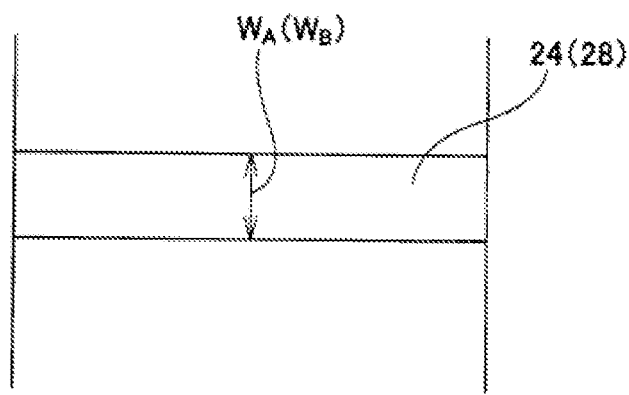
FIG. 14A and FIG. 14B are views of two examples of a convex portion configuring a first concave-convex portion (a second concave-convex portion) as seen from the radially outer side.

In this embodiment, both circumferential side surfaces of the convex portion 24 configuring the first concave-convex portion 22 are configured as flat surfaces parallel with each other. That is, a circumferential width dimension $W_A$ of the convex portion 24 configuring the first concave-convex portion 22 does not change in a radial direction, and as shown in FIG. 14A, the circumferential width dimension $W_A$ does not change in the axial direction either.

The second transmission member 18 is provided on the base end portion of the worm shaft 6a. For example, as shown in FIG. 13, the second transmission member 18 is formed into an annular shape as a whole by a method such as injection molding, casting, forging, sintering, cutting or the like with a synthetic resin mixed with reinforcing fibers if necessary, or a metal such as an iron alloy, a copper alloy, an aluminum alloy or the like. The second transmission member 18 is externally fitted to the base end portion of the worm shaft 6a by interference fitting, spline fitting, crimping or the like with relative rotation and axial relative displacement being restricted. However, when implementing the present invention, the second transmission member 18 may be formed integrally with the base end portion of the worm shaft 6a.

A second concave-convex portion 26 formed by alternately arranging concave portion 27 and convex portions 28 in the circumferential direction is provided on an outer periphery of the second transmission member 18 from one axial end portion to an axially intermediate portion (portion except for the other axial end portion). A circular ring shaped second collar portion 29 is provided at the other axial end portion on the outer periphery of the second transmission member 18 over an entire circumference thereof. The other axial opening of the concave portion 27 configuring the second concave-convex portion 26 is blocked by a positioning side surface 30b which is one axial side surface of the second collar portion 29.

In this embodiment, both circumferential side surfaces of the convex portion 28 configuring the second concave-convex portion 26 are configured as flat surfaces parallel with each other. That is, a circumferential width dimension $W_B$ of the convex portion 28 configuring the second concave-convex portion 26 does not change in the radial direction, and as shown in FIG. 14A, the circumferential width dimension $W_B$ does not change in the axial direction either.

In this embodiment, the first transmission member 17 and the second transmission member 18 are formed in the same shape and the same size. Therefore, in this embodiment, parts can be shared between the first transmission member 17 and the second transmission member 18.

Figure 15C:
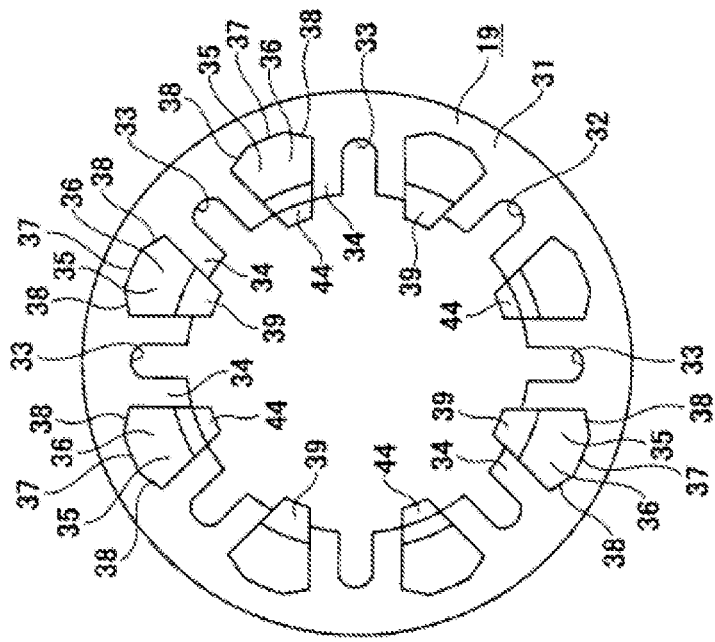
Figure 15B:
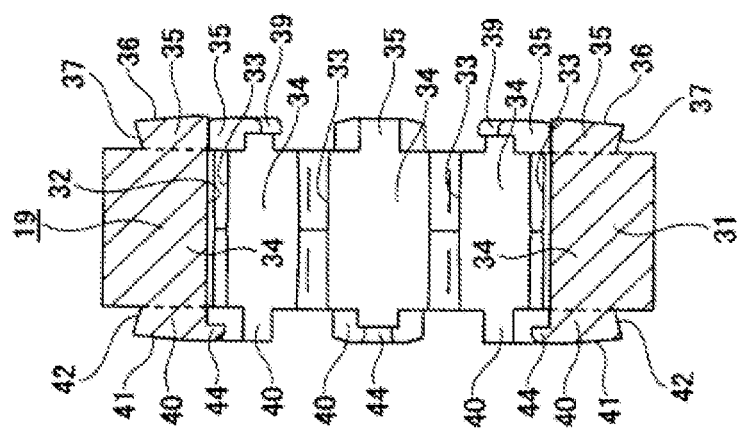
Figure 15A:
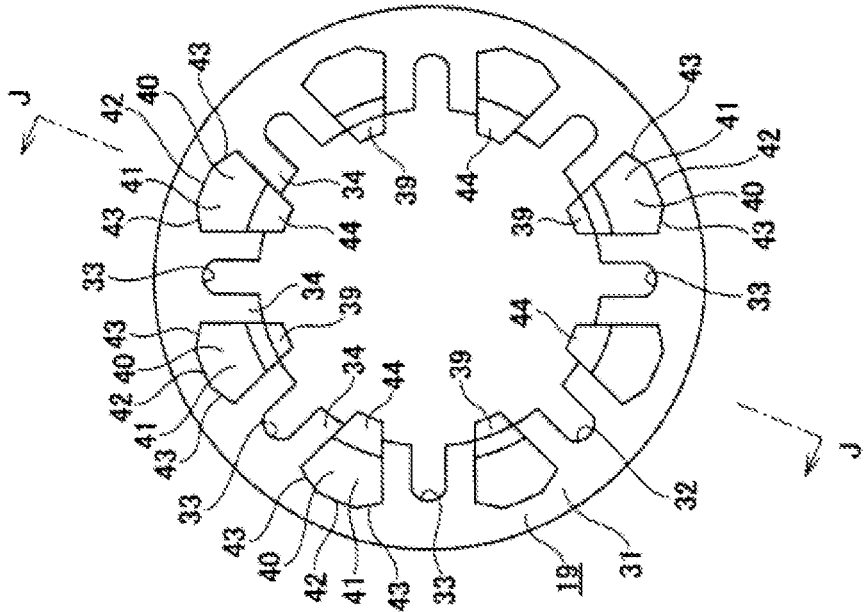

As shown in FIG. 15, for example, the intermediate transmission member 19 is formed of a material (with higher rigidity) which is less elastically deformed than the elastic material configuring the first elastic member 20 and the second elastic member 21, and is formed into a annular shape as a whole by a method such as injection molding, casting, forging, sintering, cutting or the like with a belt material with reinforced rubber by cloth, a synthetic resin (PPS, PEEK, polyamide or the like) mixed with reinforcing fibers as necessary, or a metal such as an iron alloy, a copper alloy, an aluminum alloy or the like which satisfy such conditions.

The intermediate transmission member 19 includes a main body portion 31 having a cylindrical shape and an intermediate concave-convex portion 32 formed by alternately arranging concave portions 33 and convex portions 34 in the circumferential direction on an inner periphery of the main body portion 31.

On one axial side surface of the main body portion 31, first tooth portions 35 which have a substantial fan shape as seen from the axial direction are provided to protrude in the axial direction at respective portions corresponding to circumferential center portions of the convex portions 34, 34 between a radial inner end portion and an intermediate portion. A tip surface (one axial side surface) of the respective first tooth portions 35, 35 between a radial outer end portion and an intermediate portion is configured as an inclined side surface portion 36 which is inclined in a direction toward a center side (the other axial side) of the intermediate transmission member 19 in the axial direction as proceeding toward the radially outer side. A circumferentially intermediate portion of a radially outer side surface of the respective first tooth portions 35, 35 is configured as a first inclined engaging surface portion 37 which is inclined in a direction (a direction in which a width dimension of the respective first tooth portions 35, 35 in the radial direction increases) toward the radially outer side as proceeding toward the one axial side. A pair of chamfered portions 38, 38, which are inclined in a direction toward the radially inner side as proceeding toward both circumferential sides, are provided on both circumferential end portions of the radially outer side surface of the respective first tooth portions 35, 35. A circumferential side surface (the side surface extending in the radial direction of the fan shape) of a radially intermediate portion of the respective first tooth portions 35, 35 is parallel to a circumferential side surface configuring an inner surface of the concave portion 33. A first engagement protrusion 39 protruding inward in the radial direction is provided at one axial half portion of the radially inner side surface of every other first tooth portions 35, 35 arranged in the circumferential direction. The other axial side surface of the respective first engagement protrusions 39, 39 is configured as a flat surface orthogonal to a center axis of the intermediate transmission member 19.

On the other axial side surface of the main body portion 31, second tooth portions 40 which have a substantial fan shape as seen from the axial direction are provided to protrude in the axial direction at respective portions corresponding to circumferential center portions of the convex portions 34, 34 between a radial inner end portion and an intermediate portion. A tip surface (the other axial side surface) of the respective second tooth portions 40, 40 between a radial outer end portion and an intermediate portion is configured as an inclined side surface portion 41 which is inclined in a direction toward a center side (one axial side) of the intermediate transmission member 19 in the axial direction as proceeding toward the radially outer side. A circumferentially intermediate portion of a radially outer side surface of the respective second tooth portions 40, 40 is configured as a second inclined engaging surface portion 42 which is inclined in a direction (a direction in which a width dimension of the respective second tooth portions 40, 40 in the radial direction increases) toward the radially outer side as proceeding toward the other axial side. A pair of chamfered portions 43, 43, which are inclined in a direction toward the radially inner side as proceeding toward both circumferential sides, are provided on both circumferential end portions of the radially outer side surface of the respective second tooth portions 40, 40. A circumferential side surface (the side surface extending in the radial direction of the fan shape) of a radially intermediate portion of the respective second tooth portions 40, 40 is parallel to a circumferential side surface configuring an inner surface of the concave portion 33. A second engagement protrusion 44 protruding inward in the radial direction is provided at the other axial half portion of the radially inner side surface of every other second tooth portions 40, 40 arranged in the circumferential direction. One axial side surface of the respective second engagement protrusions 44, 44 is configured as a flat surface orthogonal to the center axis of the intermediate transmission member 19.

In this embodiment, a phase of arrangement in the circumferential direction of the respective first engagement protrusions 39, 39 and the respective second engagement protrusions 44, 44 is shifted from each other by a half pitch.

When implementing the present invention, the number of the first engagement protrusions 39 (second engagement protrusions 44) may be less that the number in this embodiment, or may also be more than the number in this embodiment (for example, the same with the first tooth portions 35 (second tooth portions 40)). The phase of arrangement in the circumferential direction of the respective first engagement protrusions 39, 39 and the respective second engagement protrusions 44, 44 may be matched with each other.

In this embodiment, both half portions of the intermediate transmission member 19 in the axial direction are formed in the same shape and the same size. However, as described above, the phase of arrangement in the circumferential direction of the respective first engagement protrusions 39, 39 and the respective second engagement protrusions 44, 44 is shifted from each other by a half pitch.

As shown in FIG. 16, for example, the first elastic member 20 is formed into an annular shape as a whole by an elastic material such as rubber (NBR, HNBR or the like), elastomer (polyurethane, silicone or the like) or the like which has a rigidity lower than that of the intermediate transmission member 19, and is assembled to the one axial end portion of the intermediate transmission member 19.

In the first elastic member 20, first elastic slits 45 opening to inner periphery of the first elastic member 20 are respectively provided at a plurality of positions which are in the same phase with the concave portions 33 configuring the intermediate concave-convex portion 32 in the circumferential direction. A first through hole 46 is provided in a circumferential center portion between the first elastic slits 45, 45 in the circumferential direction of the first elastic member 20. Each of the first through holes 46, 46 has a fan shape as viewed from the axial direction and can be engaged with the first tooth portion 35 without rattling in the circumferential direction and the radial direction while the first tooth portion 35 is inserted into the first through hole 46. Particularly, an outer diameter side surface configuring an inner surface of the respective first through holes 46, 46 is configured as a first inclined engaged surface portion 47 which can surface-contact with the first inclined engaging surface portion 37 of the first tooth portion 35. A circumferential side surface (the side surface extending in the radial direction of the fan shape) configuring the inner surface of the respective first through holes 46, 46 is parallel to a circumferential side surface configuring an inner surface of adjacent first elastic slits 45, 45. In the first elastic member 20, a portion interposed between an inner periphery of the first elastic member 20 and the respective first through holes 46, 46 in the radial direction is first engagement beam 48 in which an axial half part is cut out. One axial side surface of the first elastic member 20 between a radial outer end portion and an intermediate portion is configured as an inclined side surface portion 49 which is inclined in a direction toward the other axial side (axially center side of the intermediate transmission member 19 in the axial direction) as proceeding toward the radially outer side.

Figure 1:
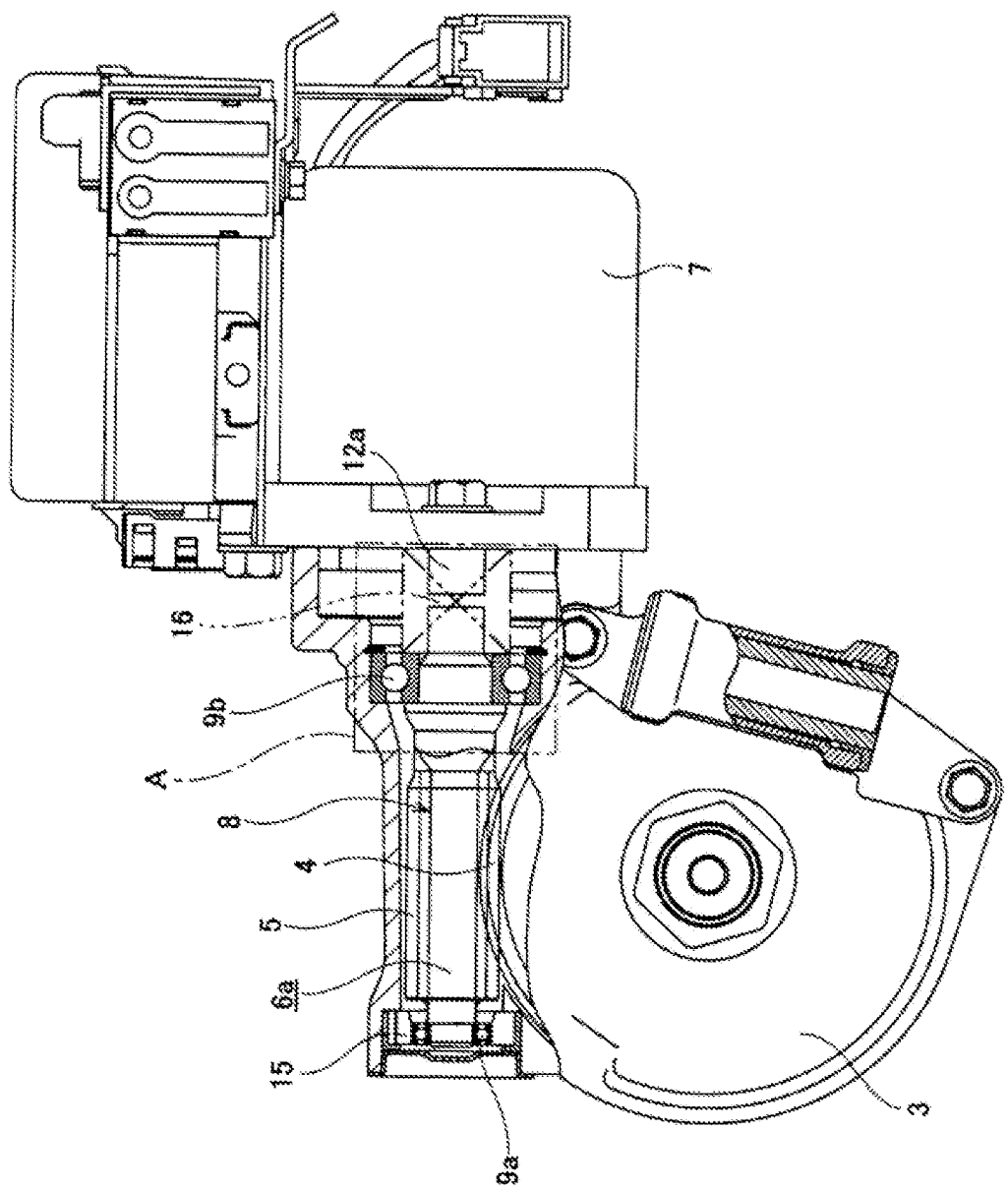
FIG. 1 is a similar view to FIG. 19 according to an embodiment of the present invention.
Figure 2:
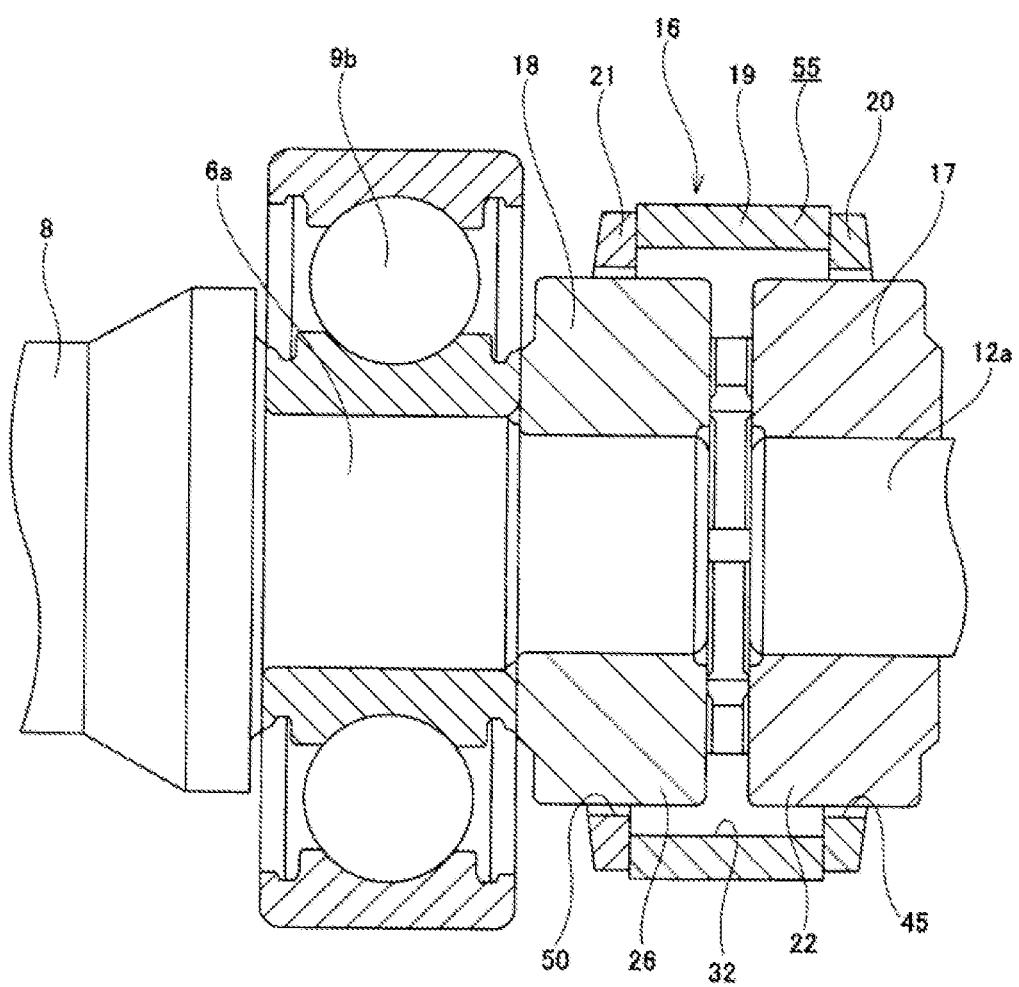
FIG. 2 is an enlarged view of a part A of FIG. 1.
Figure 3:
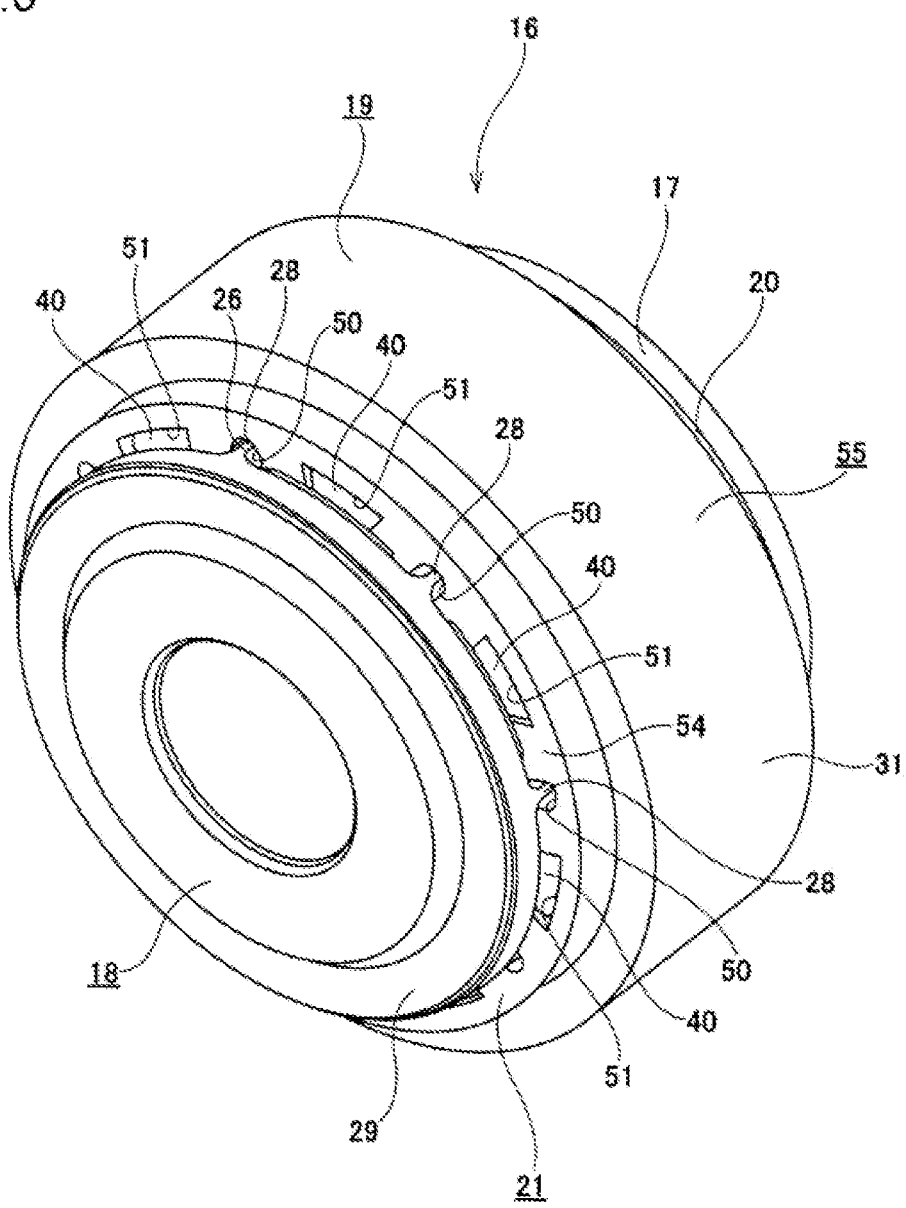
FIG. 3 is a perspective view of a torque transmission joint.
Figure 4:
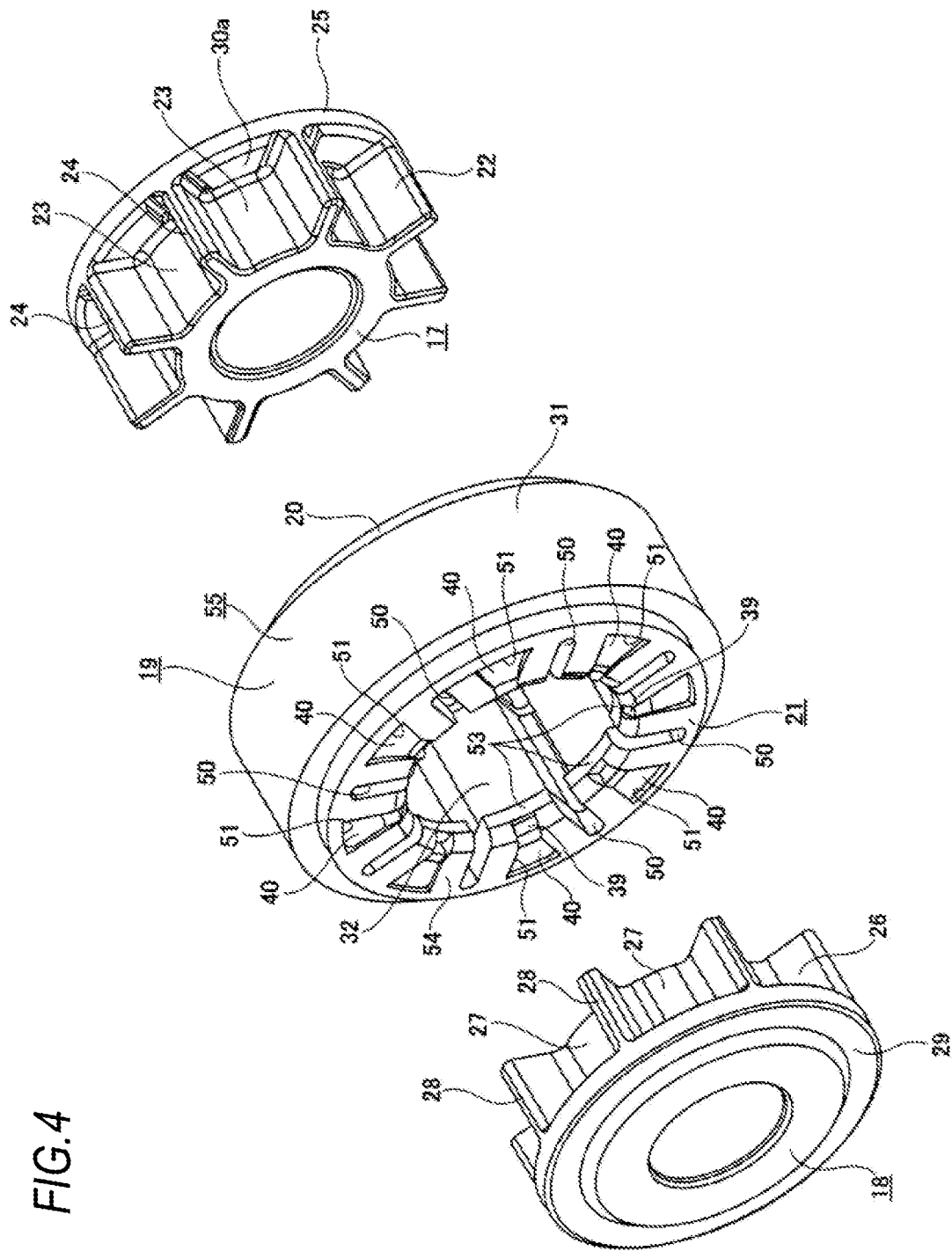
FIG. 4 is a partially exploded perspective view of the torque transmission joint.
Figure 5:
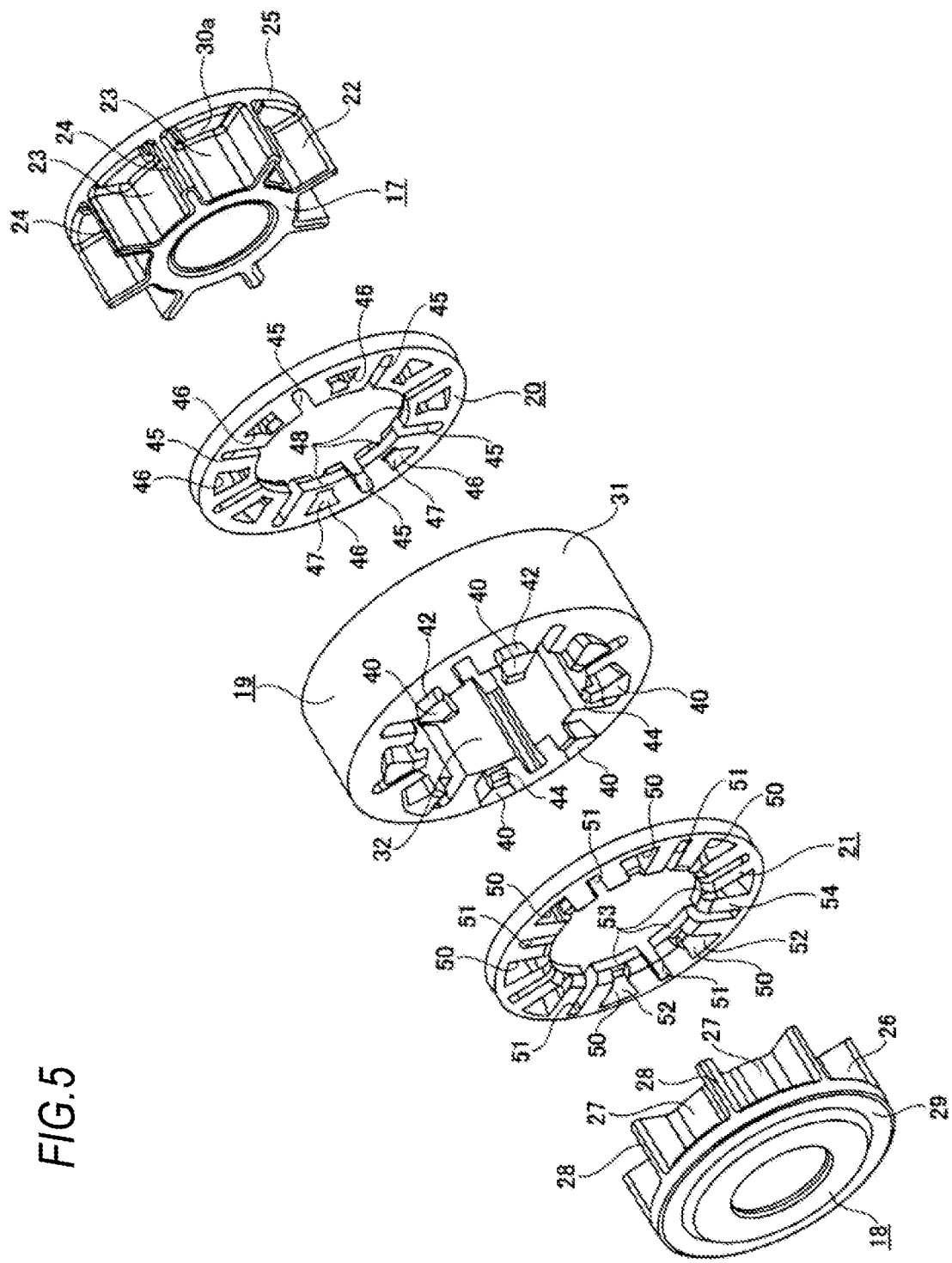
FIG. 5 is an entirely exploded perspective view of the torque transmission joint.
Figure 6:
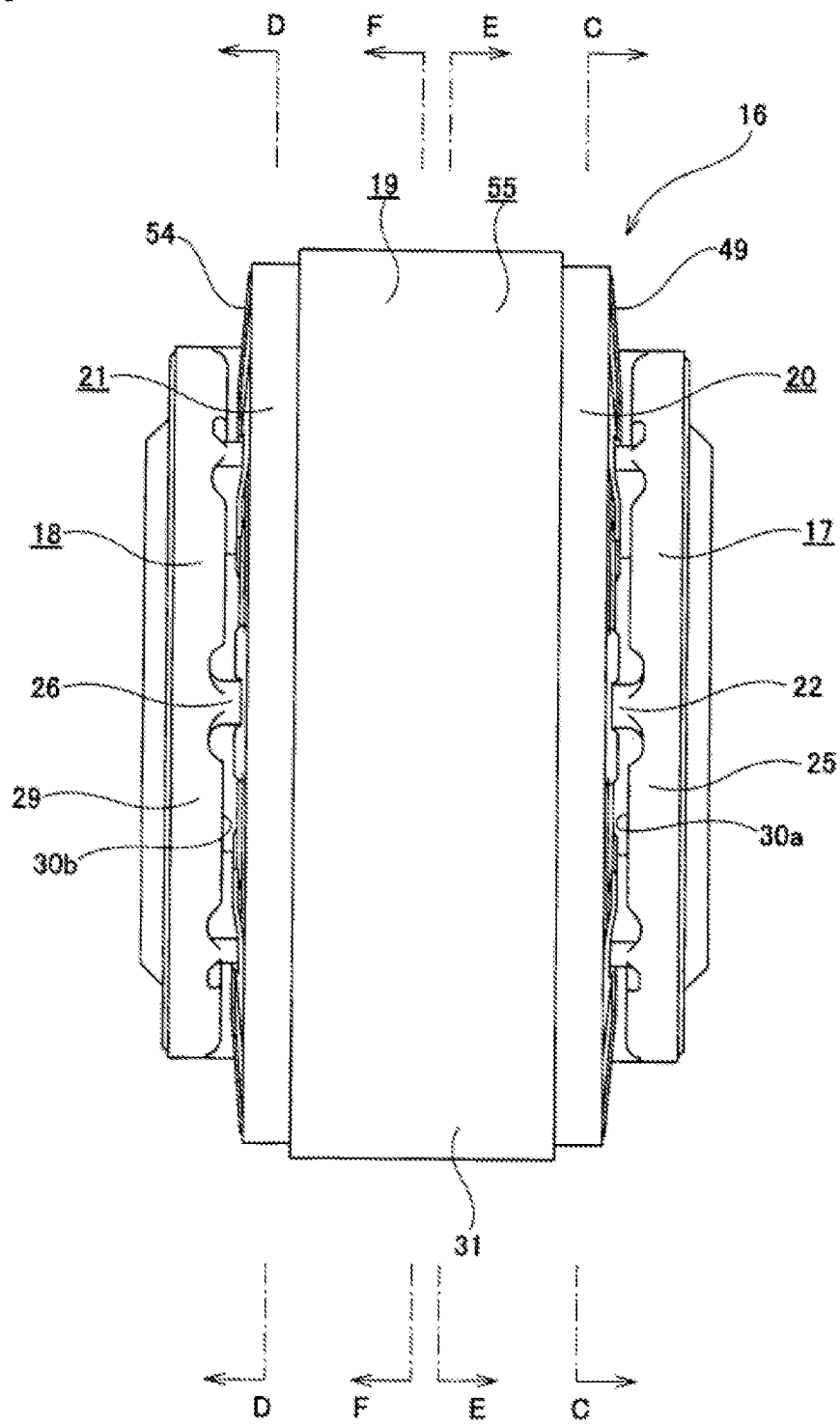
FIG. 6 is a view of the torque transmission joint as seen from a radially outer side.
Figure 7:
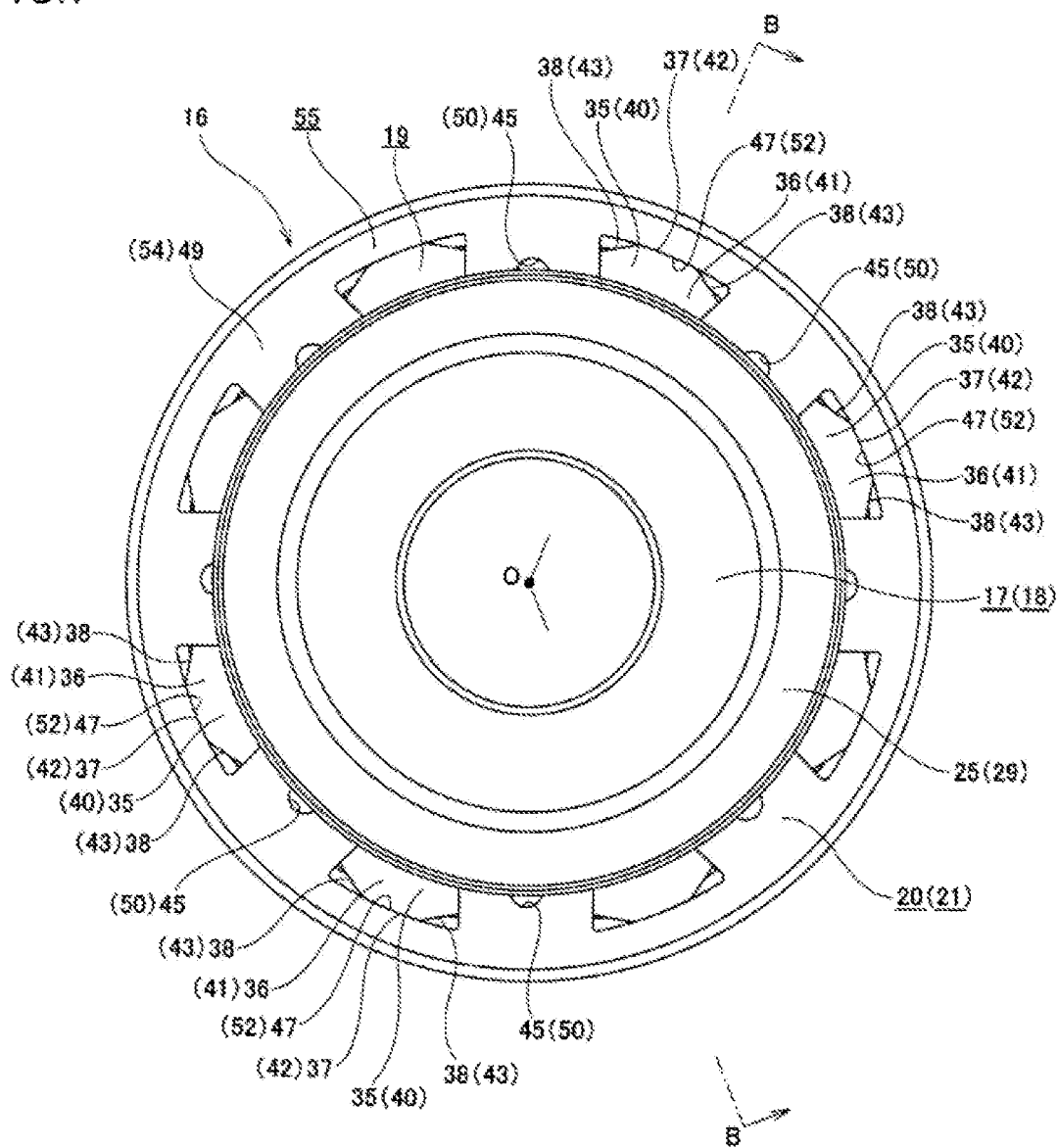
FIG. 7 is a view of the torque transmission joint as seen from one axial side (or the other axial side).
Figure 8:
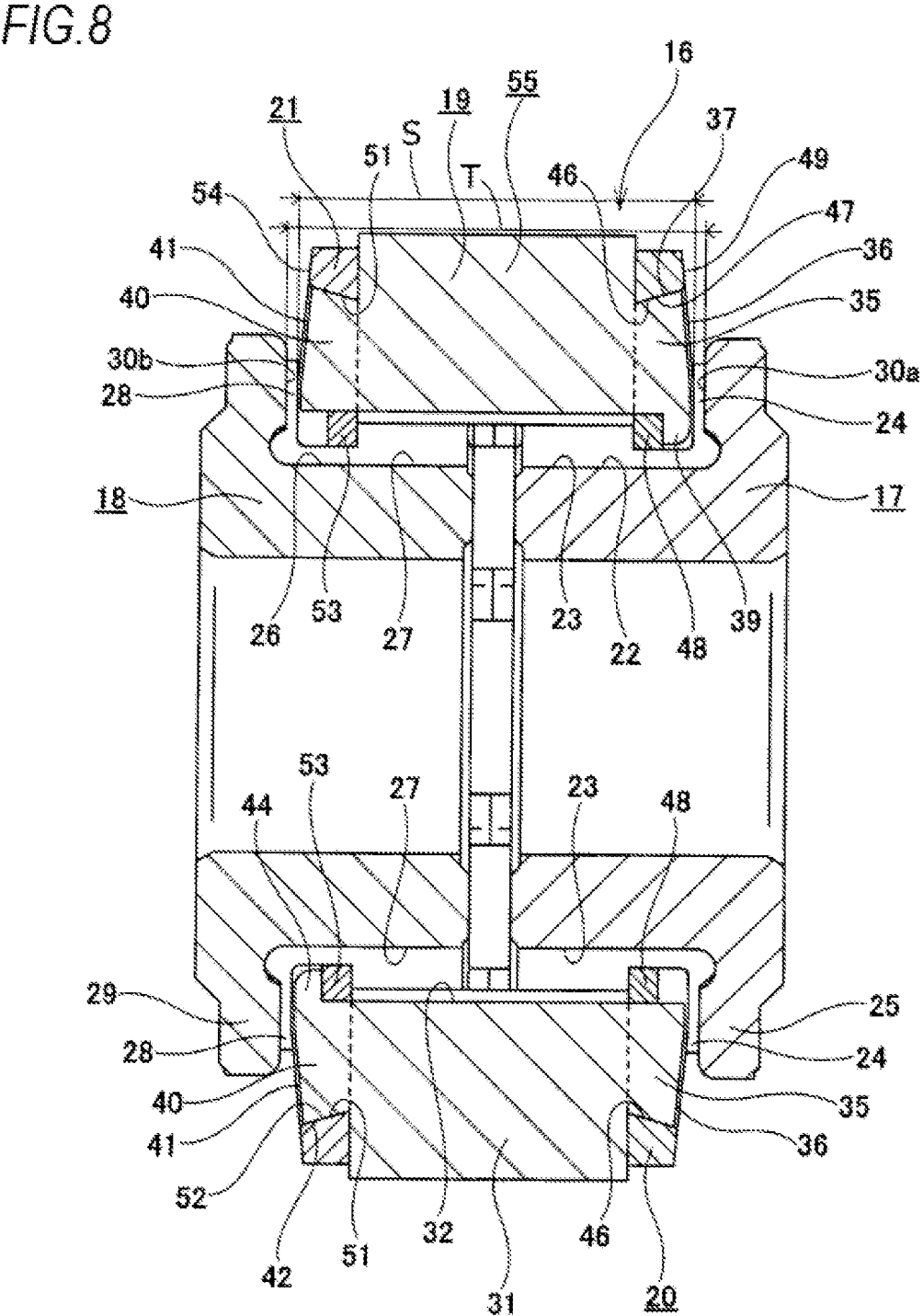
FIG. 8 is a sectional view taken along a B-O-B line of FIG. 7.

For example, as shown in FIG. 8, in a state where the first elastic member 20 is assembled to the one axial end portion of the intermediate transmission member 19, the first elastic member 20 covers one axial side surface of the intermediate transmission member 19 and the first tooth portions 35, 35 are inserted into the respective first through holes 46, 46 one by one without rattling in the circumferential direction and the radial direction. Therefore, torque can be transmitted between the intermediate transmission member 19 and the first elastic member 20 based on the engagement of both circumferential side surfaces of the respective first tooth portions 35, 35 and the inner surfaces of the respective first through holes 46, 46. In this state, the first inclined engaged surface portion 47 of the respective first through holes 46, 46 is engaged (surface-contacted) to the first inclined engaging surface portion 37 of the respective first tooth portions 35, 35, and one axial side surface of the first engagement beam 48 is engaged (surface-contacted) to the other axial side surface of the first engagement protrusion 39. Thus, based on the engagements, displacement of the first elastic member 20 to the one axial side with respect to the intermediate transmission member 19 is restricted, and separation between the intermediate transmission member 19 and the first elastic member 20 is prevented.

In this state, a substantially triangular gap is provided between the chamfered portions 38, 38 of the respective first tooth portions 35, 35 and the first inclined engaged surface portions 47 of the respective first through holes 46, 46. In this embodiment, in this state, the dimension of each part is restricted such that the one axial side surface of the first elastic member 20 is positioned on one axial side of the tip surface of the respective first tooth portions 35, 35. Also, an inner diameter dimension of the first elastic member 20 is smaller than a diameter dimension of an inscribed circle of the respective convex portions 24, 24 configuring the intermediate concave-convex portion 32 and a diameter dimension of an inscribed circle of the respective first engagement protrusions 39, 39, so that the inner periphery of the first elastic member 20 is positioned on a radially inner side of a radially inner side surface of the respective convex portions 24, 24 configuring the intermediate concave-convex portion 32 and a radial inner end edge of the respective first engagement protrusions 39, 39.

As shown in FIG. 17, for example, the second elastic member 21 is formed into an annular shape as a whole by an elastic material such as rubber (NBR, HNBR or the like), elastomer (polyurethane, silicone or the like) or the like which has a rigidity lower than that of the intermediate transmission member 19, and is assembled to the other axial end portion of the intermediate transmission member 19.

In the second elastic member 21, second elastic slits 50 opening to inner periphery of the second elastic member 21 are respectively provided at a plurality of positions which are in the same phase with the concave portions 33 configuring the intermediate concave-convex portion 32 in the circumferential direction. A second through hole 51 is provided in a circumferential center portion between the second elastic slits 50, 50 in the circumferential direction of the second elastic member 21. Each of the second through holes 51, 51 has a fan shape as viewed from the axial direction, and can be engaged with the second tooth portion 40 without rattling in the circumferential direction and the radial direction while the second tooth portion 40 is inserted into the second through hole 51. Particularly, an outer diameter side surface configuring an inner surface of the respective second through holes 51, 51 is configured as a second inclined engaged surface portion 52 which can surface-contact with the second inclined engaging surface portion 42 of the second tooth portion 40. A circumferential side surface (the side surface extending in the radial direction of the fan shape) configuring the inner surface of the respective second through holes 51, 51 is parallel to a circumferential side surface configuring an inner surface of adjacent second elastic slits 50, 50 in the circumferential direction. In the second elastic member 21, a portion interposed between an inner periphery of the second elastic member 21 and the respective second through holes 51, 51 in the radial direction is second engagement beam 53 in which the other axial half part is cut out. The other axial side surface of the second elastic member 21 between a radial outer end portion and an intermediate portion is configured as an inclined side surface portion 54 which is inclined in a direction toward one axial side (axially center side of the intermediate transmission member 19 in the axial direction) as proceeding toward the radially outer side.

For example, as shown in FIG. 8, in a state where the second elastic member 21 is assembled to the other axial end portion of the intermediate transmission member 19, the second elastic member 21 covers the other axial side surface of the intermediate transmission member 19 and the second tooth portions 40, 40 are inserted into the respective second through holes 51, 51 one by one without rattling in the circumferential direction and the radial direction. Therefore, torque can be transmitted between the intermediate transmission member 19 and the second elastic member 21 based on the engagement of both circumferential side surfaces of the respective second tooth portions 40, 40 and the inner surfaces of the respective second through holes 51, 51. In this state, the second inclined engaged surface portion 52 of the respective second through holes 51, 51 is engaged (surface-contacted) to the second inclined engaging surface portion 42 of the respective second tooth portions 40, 40, and the other axial side surface of the second engagement beam 53 is engaged (surface-contacted) to one axial side surface of the second engagement protrusion 44. Thus, based on the engagements, displacement of the second elastic member 21 to the other axial side with respect to the intermediate transmission member 19 is restricted, and separation between the intermediate transmission member 19 and the second elastic member 21 is prevented.

In this state, a substantially triangular gap is provided between the chamfered portions 43, 43 of the respective second tooth portions 40, 40 and the second inclined engaged surface portions 52 of the respective second through holes 51, 51. In this embodiment, in this state, the dimension of each part is restricted such that the other axial side surface of the second elastic member 21 is positioned on the other axial side of the tip surface of the respective second tooth portions 40, 40. Also, an inner diameter dimension of the second elastic member 21 is smaller than a diameter dimension of an inscribed circle of the respective convex portions 24, 24 configuring the intermediate concave-convex portion 32 and a diameter dimension of an inscribed circle of the respective second engagement protrusions 44, 44, so that the inner periphery of the second elastic member 21 is positioned on a radially inner side of a radially inner side surface of the respective convex portions 24, 24 configuring the intermediate concave-convex portion 32 and a radial inner end edge of the respective second engagement protrusions 44, 44.

In this embodiment, the first elastic member 20 and the second elastic member 21 are formed in the same shape and the same size. Therefore, in this embodiment, parts can be shared between the first elastic member 20 and the second elastic member 21.

In this embodiment, in a state where a coupling body 55 of the intermediate transmission member 19, the first elastic member 20 and the second elastic member 21 is assembled, the inclined side surface portion (36, 49) (41, 54) which is inclined in a direction toward the center side of the intermediate transmission member 19 in the axial direction as proceeding toward the radially outer side is provided on both axial side surfaces of the coupling body 55 between the radial outer end portion and the intermediate portion.

In this embodiment, when the coupling body 55 is assembled, the other axial end portion to the axially center portion of the first transmission member 17 is inserted from one axial side to the radially inner side of one axial end portion of the coupling body 55.

Accordingly, the convex portion 24 configuring the first concave-convex portion 22 is engaged with the first elastic slit 45 provided on the first elastic member 20 without a circumferential gap being interposed therebetween, and the first concave-convex portion 22 is engaged with one axial end portion of the intermediate concave-convex portion 32 which is provided on the intermediate transmission member 19 with a circumferential gap being interposed therebetween. That is, in this state, both circumferential side surfaces of the convex portion 24 configuring the first concave-convex portion 22 are respectively in contact with both circumferential inner side surfaces of the first elastic slit 45. On the other hand, circumferential side surfaces the convex portion 24 configuring the first concave-convex portion 22 and the convex portion 34 configuring the intermediate concave-convex portion 32 are not in contact with each other, and a circumferential gap α, α is provided between the circumferential side surfaces (see FIG. 10). The positioning side surface 30a which is the other axial side surface of the first collar portion 25 is closely facing or in contact with (closely facing in the illustrated example) one axial side surface of the coupling body 55, so that the first transmission member 17 is positioned in the axial direction with respect to the coupling body 55.

Figure 9:
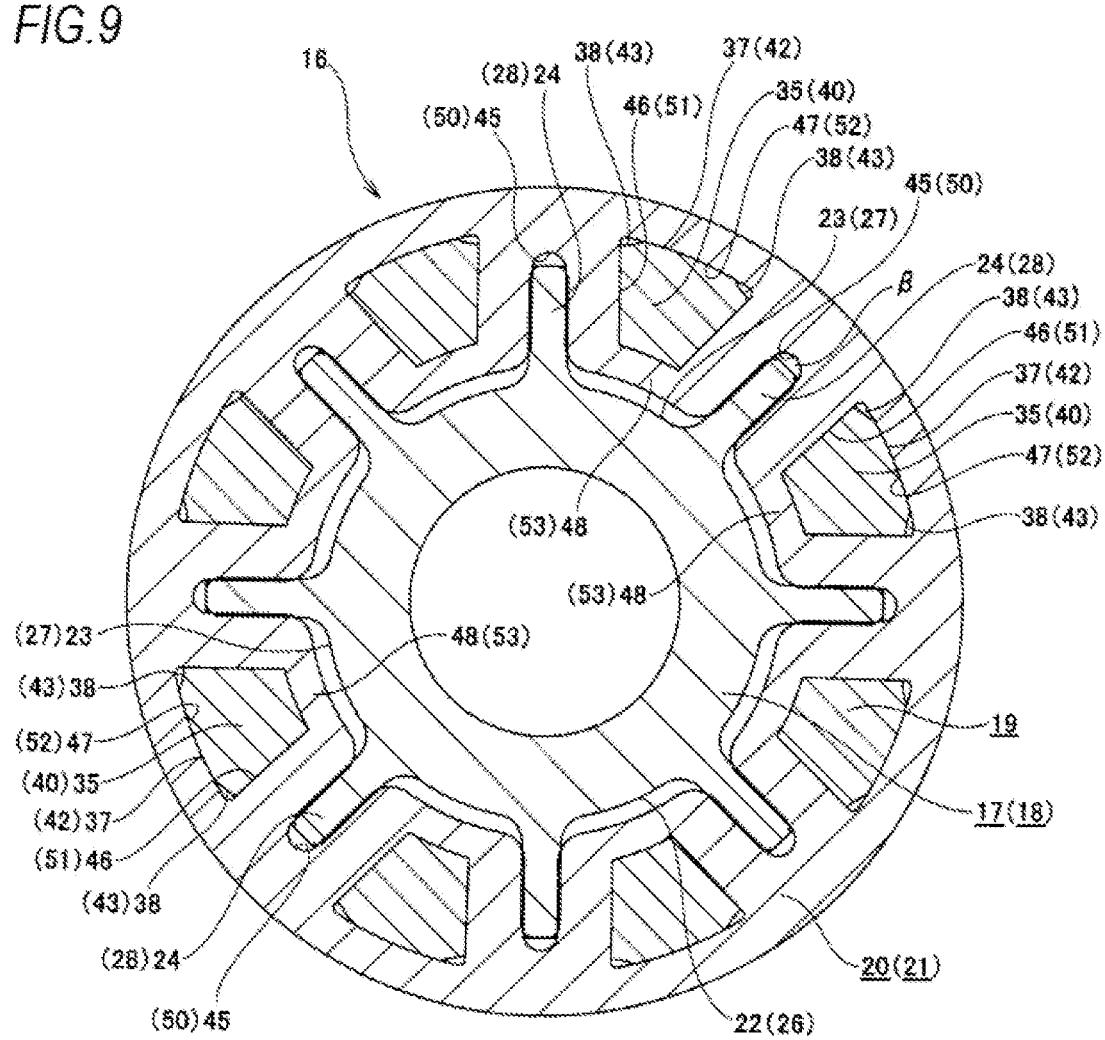
FIG. 9 is a sectional view taken along a C-C line (a D-D line) of FIG. 6.
Figure 10:
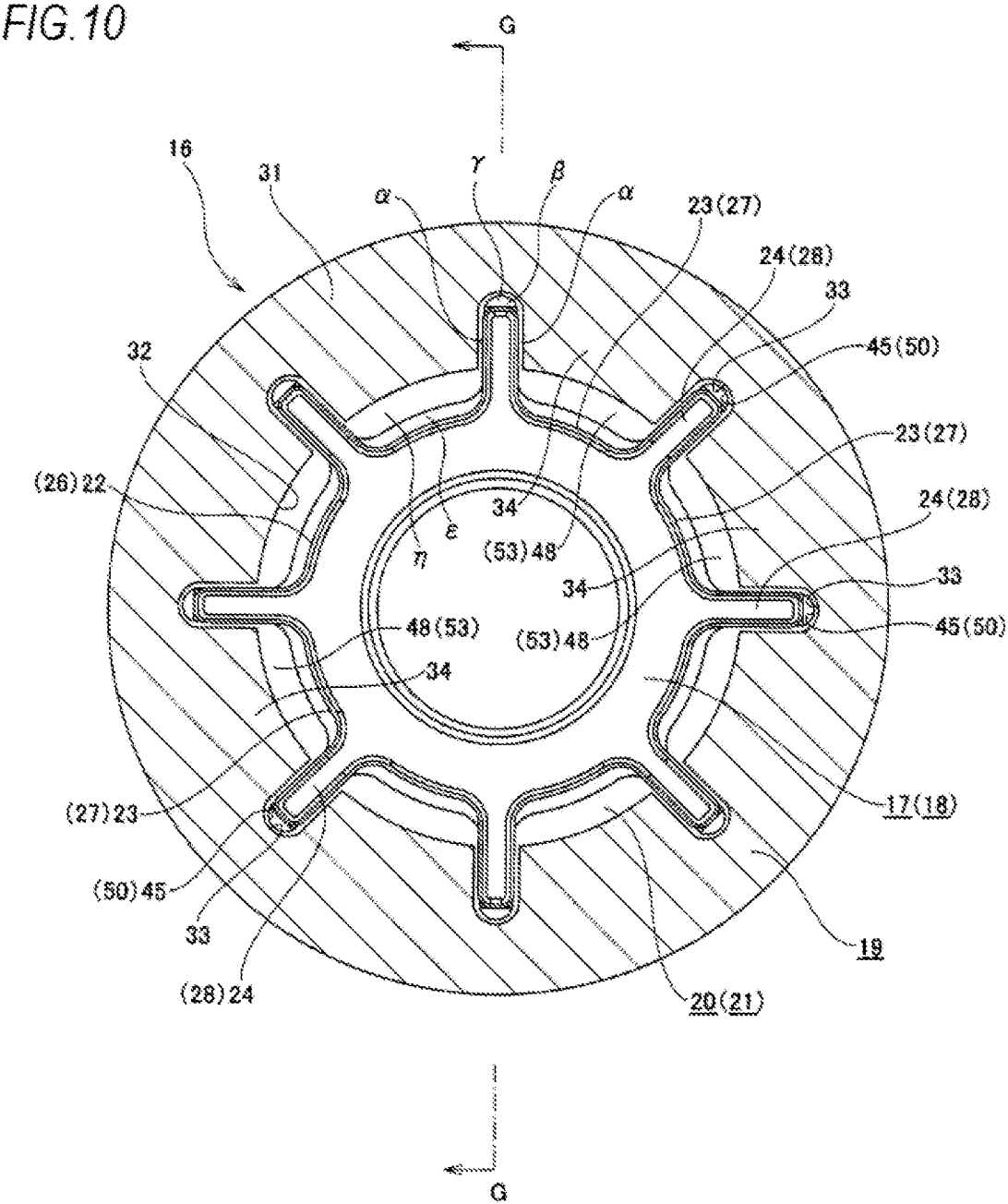
FIG. 10 is a sectional view taken along an E-E line (an F-F line) of FIG. 6.
Figure 11:
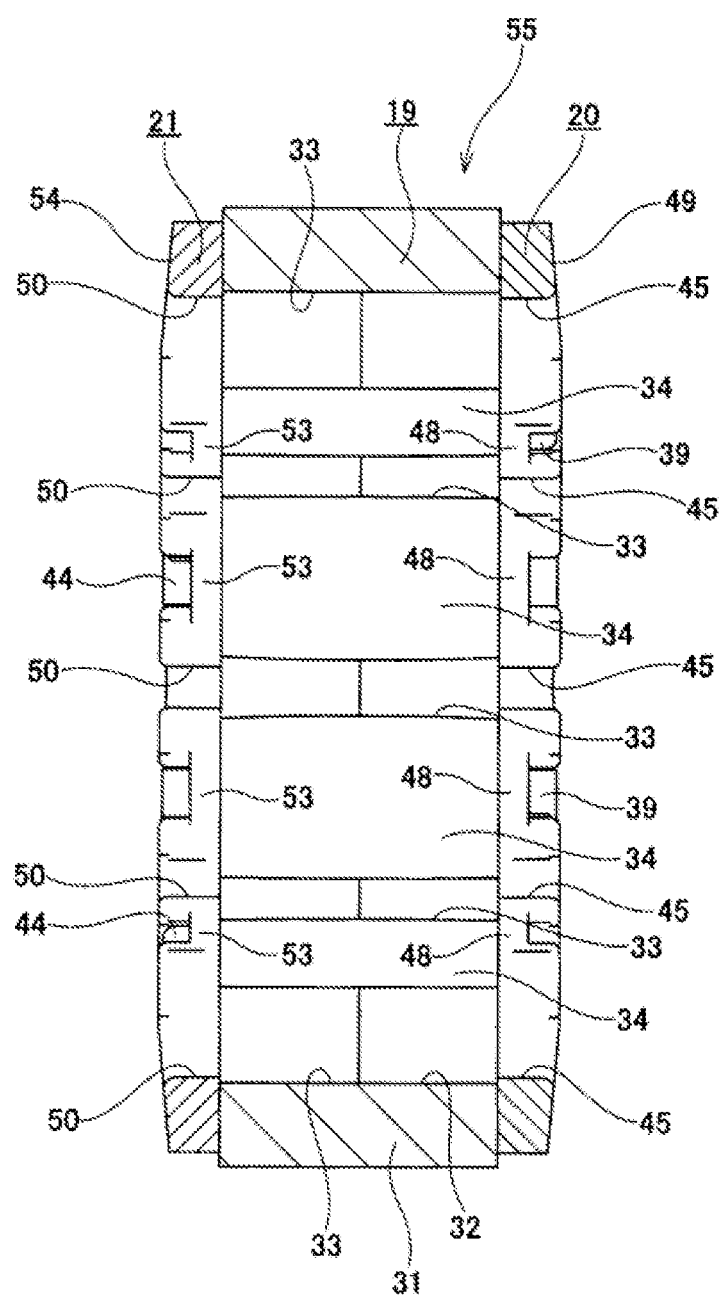
FIG. 11 is a sectional view taken along a G-G line of FIG. 10 with a first transmission member and a second transmission member omitted.

In this embodiment, in this state, a radial gap β is interposed between a radially outer end surface of the convex portion 24 configuring the first concave-convex portion 22 and a bottom surface of the first elastic slit 45, and a radial gap γ is interposed between the radially outer end surface of the convex portion 24 configuring the first concave-convex portion 22 and the bottom surface of the concave portion 33 configuring the intermediate concave-convex portion 32 (see FIGS. 9 and 10). The radial gap β is smaller than the radial gap γ (β<γ). A radial gap ε is interposed between a bottom surface of the concave portion 23 configuring the first concave-convex portion 22 and an inner periphery of the first elastic member 20, and a radial gap η is interposed between the bottom surface of the concave portion 23 configuring the first concave-convex portion 22 and the tip surface of the convex portion 34 configuring the intermediate concave-convex portion 32 (see FIG. 10). The radial gap ε is smaller than the radial gap η (ε<η).

In this embodiment, when the coupling body 55 is assembled, one axial end portion to the axially center portion of the second transmission member 18 is inserted from the other axial side to the radially inner side of the other axial end portion of the coupling body 55.

Accordingly, the convex portion 28 configuring the second concave-convex portion 26 is engaged with the second elastic slit 50 provided on the second elastic member 21 without a circumferential gap being interposed therebetween, and the second concave-convex portion 26 is engaged with the other axial end portion of the intermediate concave-convex portion 32 which is provided on the intermediate transmission member 19 with a circumferential gap being interposed therebetween. That is, in this state, both circumferential side surfaces of the convex portion 28 configuring the second concave-convex portion 26 are respectively in contact with both circumferential inner side surfaces of the second elastic slit 50. On the other hand, circumferential side surfaces the convex portion 28 configuring the second concave-convex portion 26 and the convex portion 34 configuring the intermediate concave-convex portion 32 are not in contact with each other, and a circumferential gap α, α is provided between the circumferential side surfaces. The positioning side surface 30b which is one axial side surface of the second collar portion 29 is closely facing or in contact with (closely facing in the illustrated example) the other axial side surface of the coupling body 55, so that the second transmission member 18 is positioned in the axial direction with respect to the coupling body 55.

In this embodiment, in this state, a radial gap β is interposed between a radially outer end surface of the convex portion 28 configuring the second concave-convex portion 26 and a bottom surface of the second elastic slit 50, and a radial gap γ is interposed between the radially outer end surface of the convex portion 28 configuring the second concave-convex portion 26 and the bottom surface of the concave portion 33 configuring the intermediate concave-convex portion 32. The radial gap β is smaller than the radial gap γ (β<γ). A radial gap ε is interposed between a bottom surface of the concave portion 27 configuring the second concave-convex portion 26 and an inner periphery of the second elastic member 21, and a radial gap η is interposed between the bottom surface of the concave portion 27 configuring the second concave-convex portion 26 and the tip surface (radially inner side surface) of the convex portion 34 configuring the intermediate concave-convex portion 32. The radial gap ε is smaller than the radial gap η (ε<η).

In this embodiment, in a state where the first transmission member 17 and the second transmission member 18 are assembled to the coupling body 55, the first transmission member 17 and the second transmission member 18 are arranged in series in the axial direction and do not overlap with each other in the axial direction.

An axial distance T between the positioning side surface 30a of the first transmission member 17 and the positioning side surface 30b of the second transmission member 18 is larger than an axial dimension S (specifically, the axial distance between one axial side surface of the first elastic member 20 and the other axial side surface of the second elastic member 18) of the coupling body 55 (T>S).

According to the electric power steering device of this embodiment, when torque to be transmitted between the output shaft 12a of the electric motor 7 and the worm 8 is relatively low, rotation torque of the output shaft 12a is transmitted to the first elastic member 20 from an engagement portion between the convex portions 24, 24 configuring the first concave-convex portion 22 of the first transmission member 17 and the first elastic slits 45, 45 of the first elastic member 20, and then transmitted to the intermediate transmission member 19 from an engagement portion between the first elastic member 20 and the first tooth portions 35, 35 of the intermediate transmission member 19. The torque transmitted to the intermediate transmission member 19 is transmitted to the second elastic member 21 from an engagement portion between the second tooth portions 40, 40 of the intermediate transmission member 19 and the second elastic member 21, and then transmitted to the worm 8 from an engagement portion between the second elastic slits 50, 50 of the second elastic member 21 and the convex portions 28, 28 configuring the second concave-convex portion 26 of the second transmission member 18.

In contrast, when the torque to be transmitted between the output shaft 12a and the worm 8 increases, a part of the first elastic member 20 is elastically deformed in the circumferential direction between the convex portions 24, 24 configuring the first concave-convex portion 22 and the first tooth portions 35, 35, and a part of the second elastic member 21 is elastically deformed in the circumferential direction between the convex portions 28, 28 configuring the second concave-convex portion 26 and the second tooth portions 40, 40. The convex portions 24, 24 configuring the first concave-convex portion 22 and the convex portions 28, 28 configuring the second concave-convex portion 26 are coming into contact with respective circumferential side surfaces of the convex portions 34, 34 configuring the intermediate concave-convex portion 32. Since the contact forces are weakened by the elastic deformation of the parts of the first elastic member 20 and the second elastic member 21, generation of the abnormal noise to be caused as the contact occurs can be suppressed. At this state, most of the rotation torque of the output shaft 12a is transmitted from the engagement portion between the first concave-convex portion 22 and the intermediate concave-convex portion 32 to the intermediate transmission member 19, and most of the torque transmitted to the intermediate transmission member 19 is transmitted from the engagement portion between the intermediate concave-convex portion 32 and the second concave-convex portion 26 to the worm 8 (the remaining torque is transmitted from the output shaft 12a to the worm 8 as in the case where the torque is relatively low described above).

Further, in this embodiment, even when a rotational direction of the output shaft 12*a* of the electric motor 7 is reversed, contact forces between respective circumferential side surfaces of the convex portions 24, 24 configuring the first concave-convex portion 22 as well as the convex portions 28, 28 configuring the second concave-convex portion 26 and the convex portions 34, 34 configuring the intermediate concave-convex portion 32 are weakened by the elastic deformation of the first elastic member 20 and the second elastic member 21, so that generation of the abnormal noise to be caused as the contact occurs can be suppressed.

As described above, in the electric power steering device of this embodiment, the torque transmission between the output shaft 12*a* and the worm 8 is performed via the torque transmission joint 16, so that it is possible to divide the transmission characteristic of the torque into two stages in accordance with the magnitude of the torque to be transmitted. In other words, in this embodiment, torsional rigidity of the torque transmission joint 16 has two-stage characteristics in which the torsional rigidity can be made low when the torque to be transmitted is low, and the torsional rigidity can be made high when the torque to be transmitted is high. Therefore, it is possible to make the operational feeling of the steering wheel 1 favorable.

That is, in general, when vibrational torque is applied to a portion where the worm wheel 4 is fixed from a wheel side due to rough road surface or the like, the electric power steering device detects the torque, and generates torque in a direction of canceling the torque by the electric motor 7. Accordingly, the vibrational torque (torque to be transmitted to the steering wheel 1 through the steering shaft 2) can be cancelled.

Herein, the worm 8 configured to mesh with the worm wheel 4 tends to rotate by a reactive force of the vibrational torque applied to the worm wheel 4. However, when a resistance (torsional rigidity of the torque transmission joint 16) against the relative rotation between the worm 8 and the output shaft 12*a* of the electric motor 7 is high, a rotation resistance of the worm 8 increases.

Meanwhile, since the vibrational torque, which is to be applied to the worm wheel 4, is relatively low as described above, the operability of the steering wheel 1 may be deteriorated when the rotation resistance of the worm 8 is high.

However, in this embodiment, torsional rigidity of the torque transmission joint 16 has two-stage characteristics in which the torsional rigidity can be made low when the torque to be transmitted is low, and the torsional rigidity can be made high when the torque to be transmitted is high. Therefore, it is possible to prevent occurrence of the above-described problem, and make the operational feeling of the steering wheel 1 favorable.

In the case of implementing the present invention, it is possible to divide the transmission characteristic (torsional rigidity of the torque transmission joint 16) of the torque between the output shaft 12*a* and the worm 8 into more stages than two stages, for example, when the circumferential gap of the engagement portion between the first concave-convex portion 22 and the intermediate concave-convex portion 32 is different from the circumferential gap between the second concave-convex portion 26 and the intermediate concave-convex portion 32, or when the elasticity of the first elastic member 20 is different from the elasticity of the second elastic member 21, or when circumferential gaps are provided at the engagement portion between the first concave-convex portion 22 and the first elastic slit 45 of the first elastic member 20, and at the engagement portion between the second concave-convex portion 26 and the second elastic slit 50 of the second elastic member 21, respectively, and when the circumferential gaps are different from each other. The relationship of the size of the circumferential gaps may be appropriately adjusted according to the purpose.

In this embodiment, the radial gaps β, γ, ε and η are respectively interposed at the engagement portion between the first concave-convex portion 22 and the first elastic member 20, and the engagement portion between the first concave-convex portion 22 and the intermediate concave-convex portion 32. Further, the one axial side surface of the coupling body 55 between a radial outer end portion and an intermediate portion is configured as an inclined side surface portion 36, 49 which is inclined in a direction toward a center side of the intermediate transmission member 19 in the axial direction as proceeding toward the radially outer side. Therefore, the inclination between center axes of the first transmission member 17 and the coupling body 55 can be easily received.

In this embodiment, the radial gaps β, γ, ε and η are respectively interposed at the engagement portion between the second concave-convex portion 26 and the second elastic member 21, and the engagement portion between the second concave-convex portion 26 and the intermediate concave-convex portion 32. Further, the other axial side surface of the coupling body 55 between a radial outer end portion and an intermediate portion is configured as an inclined side surface portion 41, 54 which is inclined in a direction toward a center side of the intermediate transmission member 19 in the axial direction as proceeding toward the radially outer side. Therefore, the inclination between center axes of the second transmission member 18 and the coupling body 55 can be easily received.

Therefore, in this embodiment, even if misalignment (shaft deviation or eccentricity of the output shaft 12*a* of the electric motor 7, and shaft deviation or inclination or eccentricity of the worm shaft 6*a*) occurs, the center axis of the coupling body 55 easily inclines to the center axes of the first transmission member 17 and the second transmission member 18, so that torque transmission can be performed smoothly.

As described above, in this embodiment, the one axial side surface of the main body portion 31 configuring the intermediate transmission member 19 is covered by the first elastic member 20, and the one axial side surface of the first elastic member 20 is positioned on the one axial side of the tip surface of the first tooth portion 35, 35. The other axial side surface of the main body portion 31 configuring the intermediate transmission member 19 is covered by the second elastic member 21, and the other axial side surface of the second elastic member 21 is positioned on the other axial side of the tip surface of the second tooth portion 40, 40.

Accordingly, even when large eccentricity or inclination occurs between the first transmission member 17 and the second transmission member 18, the positioning side surface 30*a*, which is the other axial side surface of the first collar portion 25, is prevented from coming into contact with the one axial side surface of the main body portion 31 or the tip surface of the first tooth portion 35, 35 based on the presence of the first elastic member 20. The positioning side surface 30*b*, which is the one axial side surface of the second collar portion 29, is prevented from coming into contact with the other axial side surface of the main body portion 31 or the tip surface of the second tooth portion 40, 40 based on the presence of the second elastic member 21.

In this case, even if the first elastic member 20 (second elastic member 21) is elastically deformed and the positioning side surface 30a (30b) comes into contact with the tip surface of the first tooth portions 35, 35 (second tooth portions 40, 40), the contact forces are weakened by the elastic deformation of the first elastic member 20 (second elastic member 21), so that generation of the abnormal noise to be caused as the contact occurs can be suppressed.

As described above, in this embodiment, the inner periphery of the first elastic member 20 is positioned on the radially inner side of the radially inner side surface of the convex portions 24, 24 configuring the intermediate concave-convex portion 32 as well as the radial inner end edge of the first engagement protrusions 39, 39. The inner periphery of the second elastic member 21 is positioned on the radially inner side of the radially inner side surface of the convex portions 24, 24 configuring the intermediate concave-convex portion 32 as well as the radial inner end edge of the second engagement protrusions 44, 44. The radial gap β between the radially outer end surface of the convex portion 24 configuring the first concave-convex portion 22 and the bottom surface of the first elastic slit 45 is smaller than the radial gap γ between the radially outer end surface of the convex portion 24 configuring the first concave-convex portion 22 and the bottom surface of the concave portion 33 configuring the intermediate concave-convex portion 32 (β<γ). Further, the radial gap ε between the bottom surface of the concave portion 23 configuring the first concave-convex portion 22 and the inner periphery of the first elastic member 20 is smaller than the radial gap η between the bottom surface of the concave portion 23 configuring the first concave-convex portion 22 and the tip surface (radially inner side surface) of the convex portion 34 configuring the intermediate concave-convex portion 32 (ε<η). The radial gap β between the radially outer end surface of the convex portion 28 configuring the second concave-convex portion 26 and the bottom surface of the second elastic slit 50 is smaller than the radial gap γ between the radially outer end surface of the convex portion 28 configuring the second concave-convex portion 26 and the bottom surface of the concave portion 33 configuring the intermediate concave-convex portion 32 (β<γ). Further, the radial gap ε between the bottom surface of the concave portion 27 configuring the second concave-convex portion 26 and the inner periphery of the second elastic member 21 is smaller than the radial gap η between the bottom surface of the concave portion 27 configuring the second concave-convex portion 26 and the tip surface (radially inner side surface) of the convex portion 34 configuring the intermediate concave-convex portion 32 (ε<η).

Therefore, even when large eccentricity or inclination occurs between the first transmission member 17 and the second transmission member 18, the bottom surface of the concave portion 23 configuring the first concave-convex portion 22 comes into contact with the inner periphery of the first elastic member 20, and the radially outer end surface of the convex portion 24 configuring the first concave-convex portion 22 comes into contact with the bottom surface of the first elastic slit 45, so that the bottom surface of the concave portion 23 configuring the first concave-convex portion 22 is prevented from coming into contact with the radially inner side surface of the convex portion 34 configuring the intermediate concave-convex portion 32 and the radial inner end portion of the first engagement protrusion 39, and the radially outer end surface of the convex portion 24 configuring the first concave-convex portion 22 is prevented from coming into contact with the bottom surface of the concave portion 33 configuring the intermediate concave-convex portion 32. Further, the bottom surface of the concave portion 27 configuring the second concave-convex portion 26 comes into contact with the inner periphery of the second elastic member 21, and the radially outer end surface of the convex portion 28 configuring the second concave-convex portion 26 comes into contact with the bottom surface of the elastic slit 39b, so that the bottom surface of the concave portion 27 configuring the second concave-convex portion 26 is prevented from coming into contact with the radially inner side surface of the convex portion 34 configuring the intermediate concave-convex portion 32 and the radial inner end portion of the second engagement protrusion 44, and the radially outer end surface of the convex portion 28 configuring the second concave-convex portion 26 is prevented from coming into contact with the bottom surface of the concave portion 33 configuring the intermediate concave-convex portion 32.

In this case, even if the radial inner end portion of the first elastic member 20 (second elastic member 21) and the first elastic slit 45 (second elastic slit 50) are elastically deformed and the bottom surface of the concave portion 23 (27) configuring the first concave-convex portion 22 (second concave-convex portion 26) comes into contact with the radially inner side surface of the convex portion 34 configuring the intermediate concave-convex portion 32 or the first engagement protrusion 39 (second engagement protrusion 44), or the radially outer end surface of the convex portion 24 (28) configuring the first concave-convex portion 22 (second concave-convex portion 26) comes into contact with the bottom surface of the concave portion 33 configuring the intermediate concave-convex portion 32, the contact forces are weakened by the elastic deformation of the first elastic member 20 (second elastic member 21). Therefore, generation of abnormal noise to be caused as the contact occurs can be suppressed.

As described above, in this embodiment, when the first elastic member 20 is assembled to the one axial end portion of the intermediate transmission member 19, the first inclined engaged surface portion 47 of the respective first through holes 46, 46 is engaged (surface-contacted) with the first inclined engaging surface portion 37 of the respective first tooth portions 35, 35, and the one axial side surface of the respective first engagement beams 48, 48 is engaged (surface-contacted) with the other axial side surface of the respective first engagement protrusions 39, 39, so that displacement of the first elastic member 20 to the one axial side with respect to the intermediate transmission member 19 is restricted. Further, when the second elastic member 21 is assembled to the other axial end portion of the intermediate transmission member 19, the second inclined engaged surface portion 52 of the respective second through holes 51, 51 is engaged (surface-contacted) to the second inclined engaging surface portion 42 of the respective second tooth portions 40, 40, and the other axial side surface of the respective second engagement beam 53, 53 is engaged (surface-contacted) with the one axial side surface of the respective second engagement protrusions 44, 44, so that displacement of the second elastic member 21 to the other axial side with respect to the intermediate transmission member 19 is restricted.

Therefore, separation between the intermediate transmission member 19 and the first elastic member 20 (second elastic member 21) can be prevented even when misalignment occurs.

Figure 14B:
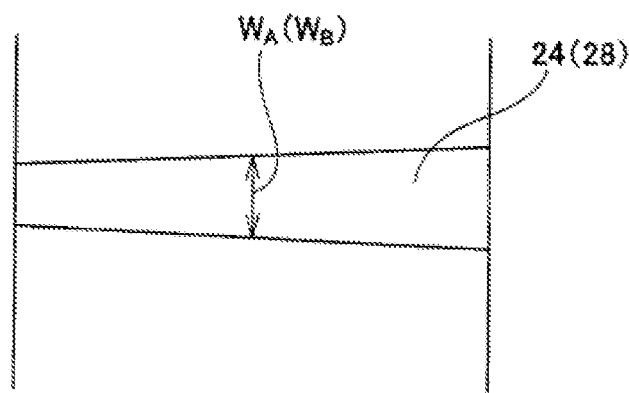

When implementing the present invention, the width dimension $W_A$ ($W_B$) of the convex portion 24 (28) configuring the first concave-convex portion 22 (second concave-convex portion 26) in the circumferential width dimension may decrease as proceeding toward the center side (the left side in FIG. 14B, a tip end side) of the intermediate transmission member 19 in the axial direction as shown in FIG. 14B for example. According to such a configuration, a contact portion between the circumferential side surfaces of the convex portion 24 (28) configuring the first concave-convex portion 22 (second concave-convex portion 26) and the convex portion 34 configuring the intermediate concave-convex portion 32 is narrowed, so that a rotation resistance to be generated at the contact portion can be suppressed when misalignment occurs. Accordingly, the first concave-convex portion 22 (second concave-convex portion 26) and the intermediate concave-convex portion 32 are effectively prevented from partially contacting when the misalignment occurs.

When implementing the present invention, the first collar portion (second collar portion) of the first transmission member (second transmission member) may be omitted.

When implementing the present invention, it is also possible to adopt a configuration in which the first transmission member includes a first concave-convex portion on the inner periphery thereof, the second transmission member includes a second concave-convex portion on the inner periphery thereof, and the intermediate transmission member includes an intermediate concave-convex portion on the outer periphery thereof.

Although the present invention has been described in detail with reference to particular embodiments, it should be appreciated for those skilled in the art that various changes and modifications can be made without departing from the spirit and scope of the present invention.

This application is based on Japanese Patent Application No. 2016-201983 filed on Oct. 13, 2016, the entire contents of which are incorporated herein by reference.

DESCRIPTION OF REFERENCE NUMERALS 1 steering wheel
2 steering shaft
3 housing
4 worm wheel
5 worm teeth
6, 6a worm shaft
7 electric motor
8 worm
9a, 9b rolling bearing
10 pressing piece
11 coil spring
12, 12a output shaft
13 spline hole
14 spline shaft portion
15 preload applying mechanism
16 torque transmission joint
17 first transmission member
18 second transmission member
19 intermediate transmission member
20 first elastic member
21 second elastic member
22 first concave-convex portion
23 concave portion
24 convex portion
25 first collar portion
26 second concave-convex portion
27 concave portion
28 convex portion
29 second collar portion
30a, 30b positioning side surface
31 main body portion
32 intermediate concave-convex portion
33 concave portion
34 convex portion
35 first tooth portion
36 inclined side surface portion
37 first inclined engaging surface portion
38 chamfered portion
39 first engagement protrusion
40 second tooth portion
41 inclined side surface portion
42 second inclined engaging surface portion
43 chamfered portion
44 second engagement protrusion
45 first elastic slit
46 first through hole
47 first inclined engaged surface portion
48 first engagement beam
49 inclined side surface portion
50 second elastic slit
51 second through hole
52 second inclined engaged surface portion
53 second engagement beam
54 inclined side surface portion
55 coupling body

The invention claimed is:

1. A torque transmission joint comprising:
an intermediate transmission member which includes:
a main body portion including an intermediate concave-convex portion formed by alternately arranging concave portions and convex portions in a circumferential direction on one radial side periphery;
first tooth portions provided at a plurality of circumferential positions on one axial side surface of the main body portion to protrude in an axial direction;
second tooth portions provided at a plurality of circumferential positions on another axial side surface of the main body portion to protrude in the axial direction;
a first engagement portion provided in at least one of the first tooth portions; and
a second engagement portion provided in at least one of the second tooth portions;
a first elastic member which is formed of an elastic material to have an annular shape and is configured to transmit torque with the intermediate transmission member by engaging with the first tooth portions and to be restricted from being displaced to one axial side with respect to the intermediate transmission member by engaging with the first engagement portion;
a second elastic member which is formed of an elastic material to have an annular shape and is configured to transmit torque with the intermediate transmission member by engaging with the second tooth portions and to be restricted from being displaced to another axial side with respect to the intermediate transmission member by engaging with the second engagement portion;
a first transmission member which includes a first concave-convex portion formed by alternately arranging concave portions and convex portions in the circumferential direction on another radial side periphery, wherein the first concave-convex portion is engaged with the first elastic member such that torque can be transmitted and is engaged with one axial end portion of the intermediate concave-convex portion with a circumferential gap being interposed therebetween such that torque can be transmitted; and a second transmission member which includes a second concave-convex portion formed by alternately arranging concave portions and convex portions in the circumferential direction on another radial side periphery, wherein the second concave-convex portion is engaged with the second elastic member such that torque can be transmitted and is engaged with another axial end portion of the intermediate concave-convex portion with a circumferential gap being interposed therebetween such that torque can be transmitted.

2. The torque transmission joint according to claim 1, wherein the first concave-convex portion is engaged with the one axial end portion of the intermediate concave-convex portion in a state where the circumferential gap interposed therebetween is larger than a circumferential gap interposed between the first concave-convex portion and the first elastic member at an engagement portion therebetween.

3. The torque transmission joint according to claim 1, wherein the second concave-convex portion is engaged with the another axial end portion of the intermediate concave-convex portion in a state where the circumferential gap interposed therebetween is larger than a circumferential gap interposed between the second concave-convex portion and the second elastic member at an engagement portion therebetween.

4. The torque transmission joint according to claim 1, wherein the first engagement portion is provided on a radial side surface of the at least one of the first tooth portions, and the second engagement portion is provided on a radial side surface of the at least one of the second tooth portions.

5. The torque transmission joint according to claim 4, wherein, as the first engagement portion, a first inclined engaging surface portion which is inclined in a direction in which a width dimension of the first tooth portion in the radial direction increases as proceeding toward one axial side or a first engagement protrusion protruding in the radial direction is provided on at least one of one radial side surface and another radial side surface of the at least one of the first tooth portions, and wherein, as the second engagement portion, a second inclined engaging surface portion which is inclined in a direction in which a width dimension of the second tooth portion in the radial direction increases as proceeding toward the other axial side or a second engagement protrusion protruding in the radial direction is provided on at least one of one radial side surface and another radial side surface of the at least one of the second tooth portions.

6. The torque transmission joint according to claim 1, wherein a positioning side surface which is in contact with or closely facing an axial side surface of a coupling body of the intermediate transmission member, the first elastic member and the second elastic member is provided on at least one of the first transmission member and the second transmission member.

7. The torque transmission joint according to claim 1, wherein an axial side surface of a coupling body of the intermediate transmission member, the first elastic member and the second elastic member has an inclined side surface portion which is inclined in a direction toward an axially center side of the coupling body as proceeding toward another radial side.

8. The torque transmission joint according to claim 1, wherein a circumferential width dimension of a convex portion configuring at least one of the first concave-convex portion and the second concave-convex portion decreases as proceeding toward an axially center side of the intermediate transmission member.

9. An electric power steering device comprising:
a rotary shaft which is rotatably supported to a housing;
a worm wheel which is supported coaxially with the rotary shaft and configured to rotate together with the rotary shaft;
a worm which includes a worm shaft and worm teeth provided on an outer periphery of the worm shaft and is rotatably supported to the housing with the worm teeth being meshed with the worm wheel; and
an electric motor which is configured to rotate the worm, wherein an output shaft of the electric motor which is a driving shaft and the worm shaft which is a driven shaft are connected by a torque transmission joint such that torque can be transmitted,
wherein the torque transmission joint is the torque transmission joint according to claim 1, and
wherein the first transmission member is fixed to or integrally formed with a tip portion of the output shaft of the electric motor, and the second transmission member is fixed to or integrally formed with a base end portion of the worm shaft.

10. The electric power steering device according to claim 9, further comprising:
a preload applying mechanism which is provided between a tip portion of the worm shaft and the housing and configured to elastically press the worm toward the worm wheel.

* * * * *